(12) United States Patent
Arai et al.

(10) Patent No.: US 9,063,356 B2
(45) Date of Patent: Jun. 23, 2015

(54) METHOD FOR REPAIRING DISPLAY DEVICE AND APPARATUS FOR SAME

(75) Inventors: Takeshi Arai, Yokohama (JP); Nobuaki Nakasu, Kawasaki (JP); Tadao Edamura, Hitachinaka (JP); Noriyuki Oroku, Takasaki (JP)

(73) Assignees: JAPAN DISPLAY INC., Tokyo (JP); PANASONIC LIQUID CRYSTAL DISPLAY CO., LTD., Hyogo-Ken (JP)

( * ) Notice: Subject to any disclaimer, the term of this patent is extended or adjusted under 35 U.S.C. 154(b) by 1143 days.

(21) Appl. No.: 12/507,826

(22) Filed: Jul. 23, 2009

(65) Prior Publication Data

US 2010/0062182 A1  Mar. 11, 2010

(30) Foreign Application Priority Data

Sep. 5, 2008 (JP) .................................. 2008-227750
Sep. 26, 2008 (JP) .................................. 2008-247112

(51) Int. Cl.
   *C23C 16/44* (2006.01)
   *C23C 16/00* (2006.01)
   *C23C 16/52* (2006.01)
   *G02F 1/13* (2006.01)

(52) U.S. Cl.
   CPC .................................... *G02F 1/1309* (2013.01)

(58) Field of Classification Search
   USPC .......... 118/733, 692, 723 R, 723 E, 500, 504; 156/345.3
   See application file for complete search history.

(56) References Cited

U.S. PATENT DOCUMENTS

| | | | |
|---|---|---|---|
| 5,748,296 A * | 5/1998 | Canteloup ....................... 356/72 |
| 7,323,080 B2 * | 1/2008 | Kim et al. ................. 156/345.33 |
| 7,396,022 B1 * | 7/2008 | Moghadam et al. .............. 279/3 |
| 7,955,513 B2 * | 6/2011 | Carr ................................ 216/63 |
| 2003/0087530 A1 | 5/2003 | Carr |
| 2005/0123676 A1 * | 6/2005 | Kuwahara et al. .............. 427/66 |
| 2006/0065645 A1 * | 3/2006 | Nakasu et al. ........... 219/121.68 |
| 2010/0062182 A1 * | 3/2010 | Arai et al. ..................... 427/569 |

FOREIGN PATENT DOCUMENTS

| | | |
|---|---|---|
| JP | 01-502149 | 7/1989 |
| JP | 07-048496 | 5/1995 |
| JP | 08-066652 | 3/1996 |
| JP | 09-307217 | 11/1997 |

(Continued)

OTHER PUBLICATIONS

Machine Generated English Translation of JP 08-066652 published Mar. 12, 1996.*

(Continued)

*Primary Examiner* — Sylvia R MacArthur
(74) *Attorney, Agent, or Firm* — Lowe Hauptman & Ham, LLP

(57) ABSTRACT

An object of the present invention is to provide a method for repairing a display device according to which a wide variety of regions can be repaired in various ways using various materials, as well as an apparatus for the same. The present invention provides a repairing apparatus for repairing a pattern defect on a surface of a substrate in a display device where an electronic circuit pattern having the above described pattern defect is formed, characterized by having a plasma irradiation means for repairing the above described pattern defect through local irradiation of a region including the above described pattern defect with plasma.

7 Claims, 32 Drawing Sheets

(56) References Cited

FOREIGN PATENT DOCUMENTS

| | | |
|---|---|---|
| JP | 11-061413 | 3/1999 |
| JP | 2000-096248 | 4/2000 |
| JP | 2003-051490 | 2/2003 |
| JP | 2004-031603 | 1/2004 |
| JP | 2005-509257 A | 4/2005 |
| JP | 2006-210726 | 8/2006 |
| JP | 2008-098128 | 4/2008 |
| JP | 2008-159930 | 7/2008 |

OTHER PUBLICATIONS

Machine Generated English Translation of JP 2000-096248 published Apr. 4, 2000.*

Machine Generated English Translation of JP 2008-159930 published Jul. 10, 2008.*

Machine Generated English Translation of JP 09-307217 published Nov. 28, 1997.*

* cited by examiner

METHOD FOR REPAIRING DISPLAY DEVICE AND APPARATUS FOR SAME

The present application claims priority over Japanese Application JP2008-227750 filed on Sep. 5, 2008 and Japanese Application JP 2008-247112 filed on Sep. 26, 2008, the contents of which are hereby incorporated into this application by reference.

BACKGROUND OF THE INVENTION (1) Field of the Invention

The present invention relates to a method for repairing a display device and an apparatus for the same, and in particular, to a technology for repairing a display device using a plasma jet generated under atmospheric pressure so that a short-circuited portion or an open portion of the electrical circuit pattern on the substrate becomes normal.

In addition, the present invention also relates to a manufacturing method according to which a film can be locally formed or a surface locally processed, as well as a manufacturing apparatus for the same, and in particular, to a technology for local film formation or surface processing with a gas flowing through a reaction chamber.

(2) Related Art Statement

Liquid crystal display devices have a structure where liquid crystal is sandwiched between a pair of substrates where a color filter is formed on one substrate (sometimes referred to as filter substrate) by alternately applying blue, green and red resins, and an electronic circuit pattern including thin film transistors (TFT's) is formed on the other substrate (sometimes referred to as TFT substrate).

When there is a defect in the pattern of the color filter or a wire, the display of the liquid crystal display device becomes abnormal, and thus the product is inferior. Display abnormalities include color defects caused by the resin applied on the color filter sticking out over an adjoining pixel, unevenness in the color caused by inconsistency in the film thickness of the resins or the TFT substrate, short-circuiting and disconnection of wires and the like.

In methods for detecting such pattern defects, a general pattern inspecting apparatus which takes an image of the circuit pattern using an appearance inspecting apparatus and carries out an image process so that defects can be detected can be used.

As a method for repairing color filters where the color resins stick out over adjoining pixels or a wire has short-circuited, a repairing method according to which the short-circuited portion is irradiated with a laser beam and removed is generally used, as disclosed in Japanese Unexamined Patent Publication H9 (1997)-307217 (Reference 1), for example.

As a method for repairing a wire by filling in a missing portion with an appropriate material, there is a method for applying a wire material using a pipette with a finely pointed end, as disclosed in Japanese Unexamined Patent Publication H8 (1996)-66652 (Reference 2), for example. In addition, methods for depositing a metal thin film, referred to as laser CVD methods, according to which a desired region of a circuit substrate can be supplied with a material gas for a metal wire and irradiated with a laser beam so that the material gas decomposes are disclosed in Japanese Unexamined Patent Publication H7 (1995)-484967 (Reference 3) and Japanese Unexamined Patent Publication H11 (1999)-61413 (Reference 4) for example.

Liquid crystal display elements have a structure where liquid crystal is sandwiched between a TFT substrate where a circuit is formed on a glass substrate and a color filter substrate. When there is a defect on the circuit or the color filter, the liquid crystal display element has abnormal display, and thus becomes a defective product. The glass substrates used during the manufacturing process are becoming larger year by year, and it has become difficult to manufacture liquid crystal display elements having no defects simply by improving the process, and therefore, technology for repairing defective portions has become indispensable.

As a conventional method for repairing a circuit having a defect caused by a missing portion, a repairing method for locally forming a metal or insulating film so as to fill in the defective portion on the substrate using a laser CVD apparatus, a microplasma generating apparatus or the like can be used. In laser CVD apparatuses, a substrate is irradiated with a laser beam in a material gas atmosphere, so that the reaction of the material can be accelerated in the irradiated portion and a film is formed. In addition, in microplasma generating apparatuses, a material gas is introduced into a reaction chamber where microplasma is generated, so that the plasma accelerates the reaction of the material gas and a film is formed. In either apparatus, a technology for collecting the material gas so that it can be prevented from leaking out is necessary. In addition, a technology for preventing outside air from flowing into the reaction chamber is necessary, because the quality of the film deteriorates when air mixes in with the material gas.

With glass substrates increasing in size, the length of the side of some substrates may be more than 2 meters. Therefore, when the substrate is entirely surrounded by a chamber, the apparatus becomes very large, and problems arise, such that it takes time to replace the air within the chamber with an inert gas, such as argon, and in addition, the cost of the inert gas is high. Thus, a method for forming a film according to which a local gas sucking and discharging mechanism is attached is used, as in Japanese Translation of International Unexamined Patent Publication H1 (1989)-502149 (Reference 5), in the case where a film is locally formed in a laser CVD apparatus or microplasma generating apparatus. When a local gas sucking and discharging mechanism is used, only the reaction region is covered with a reaction chamber so that an inert atmosphere is provided, and therefore, it becomes unnecessary for the chamber to be large, and the time required for replacement with an inert gas can be shortened.

Local gas sucking and discharging mechanisms have a structure where a number of shells overlap in such a manner that the innermost shell provides a reaction chamber into which a material gas and a gas for generating plasma are introduced, so that a film can be formed or a surface process carried out, and gas that leaks out from the reaction chamber is sucked into the shell directly outside the innermost shell. One side of the shells is open, and the side with openings is located at a certain distance from the substrate on which a film is formed or a surface process carried out. It is necessary to keep the concentration and pressure of the material gas or gas for generating plasma supplied into the reaction chamber constant, and therefore, a new gas can be constantly supplied into the reaction chamber so as to replace the reacted gas. Accordingly, it is important to stabilize the flow of the discharged gas, so that the reacted gas can be smoothly discharged.

Japanese Unexamined Patent Publication 2003-51490 (Reference 6) discloses a plasma processing apparatus having a different structure from that described above. This plasma processing apparatus is provided with an opening for discharging the process gas that has been converted to plasma in the plasma generating portion toward a substrate, an opening for discharging exhaust provided at an appropriate distance from the opening for discharging the process gas, a gas discharging means for discharging waste gas through the opening for discharging exhaust after processing, a labyrinth sealing portion provided around the outer periphery of the plasma generating portion, and an inert gas supplying means for supplying an inert gas between the labyrinth sealing portion and the substrate. This plasma generating portion is provided so as to correspond to the width of the substrate (see FIG. 1), and the opening for discharging exhaust is in slit form and provided on the right side of the opening for discharging the process gas, which is also in slit form, so that the slits are parallel (see FIGS. 2 and 3), or openings for discharging exhaust in slit form may be provided on both sides (left and right) of the opening for discharging the process gas (see FIG. 7).

SUMMARY OF THE INVENTION

Problem to be Solved by the Invention

It is difficult to selectively process a material in the short-circuit repairing apparatus using a laser beam described in Reference 1, and therefore, not only the upper layer film but also the lower layer film is damaged in the portion irradiated with the laser. Thus, a problem arises, such that there are limitations to the region that can be repaired.

According to the application method described in Reference 2, a material is applied with the pipette making contact, and therefore, the substrate may become damaged when repaired, and thus, there are limitations to the region that can be repaired, as in Reference 1.

The laser CVD technology described in Reference 3 has a drawback, such that the decomposition of the material gas depends heavily on the light absorbing properties of the laser beam with which the substrate is irradiated, and therefore, in many cases only a metal thin film, such as of tungsten (W), can be formed, and thus, there is a problem, such that it is difficult to form an insulating, thin film, such as of silicon oxide (SiO2), for which the material gas absorbs little light.

In addition, there are limitations to the types of defects that can be repaired using one apparatus in the methods for repairing a display device described in References 1 to 3, and thus, a repairing apparatus that can repair different types of defects is required.

An object of the present invention is to provide a method for repairing a display device according to which a wide variety of regions can be repaired in various ways using various materials, as well as an apparatus for the same.

There is a problem, such that the gas flow amount fluctuates, and the film formation and surface process become abnormal when the space between the local gas sucking and discharging mechanism and the substrate fluctuates due to undulation of the substrate.

An object of the present invention is to reduce the fluctuation in the gas flow amount caused by the fluctuation in the space between the local gas sucking and discharging mechanism and the substrate due to undulation of the substrate, and thus stabilize the film formation and surface process.

Means for Solving Problem

The apparatus for repairing a display device according to the present invention is an apparatus for repairing a display device having a pattern defect on a surface of a substrate where an electronic circuit pattern having the above described pattern defect is formed, and characterized by having a plasma irradiation means for repairing the above described pattern defect through local irradiation of a region including the above described pattern defect with plasma.

The method for repairing a display device according to the present invention is a method for repairing a display device having a pattern defect on a surface of a substrate where an electronic circuit pattern having the above described pattern defect is formed, and characterized in that the above described pattern defect is repaired through local irradiation of a region including the above described pattern defect with plasma.

In addition, the method for repairing a display device according to the present invention is a method for repairing a display device characterized in that plasma is generated by applying high-frequency power to an inert gas supplied into a tubule for generating plasma from one end of the above described tubule, the plasma jet is finely pointed as a result of a mask provided between the other end of the above described tubule for generating plasma and the substrate, and a reactive gas supplied from a second gas supplying portion decomposes in accordance with the physical amount of the gas supplied from a first gas supplying portion so that a pattern defect in an electronic circuit pattern on the above described substrate can be repaired.

In addition, according to the present invention, the local gas sucking and discharging mechanism has: an upper lid; an inner wall surrounding the center of the upper lid provided on the bottom of the upper lid in the direction of a substrate; and an outer wall surrounding the above described inner wall provided on the bottom of the upper lid in the direction of the substrate, and the outer wall and/or inner wall has a labyrinth structure with trenches on the open side. In addition, a measuring portion for measuring the pressure in the reactive chamber is provided, so that the height of the local gas sucking and discharging mechanism can be adjusted on the basis of the results of measurement.

Here, the above described configurations are merely examples, and appropriate modifications are possible for the present invention, provided that they do not deviate from the technical idea. In addition, examples of the configuration of the present invention other than those described above will become more clear from the entirety of the description of the present specification and the drawings.

Effects of the Invention

According to the present invention, a wide variety of regions can be repaired in various ways using various materials. In addition, inconsistency in the quality of the formed film can be reduced, the surface quality can be uniformly improved, and defects can be prevented, and thus, the cost of manufacture can be lowered.

DETAILED DESCRIPTION OF THE INVENTION

The embodiments of the present invention are described below in reference to the drawings.

(First Embodiment)

Figure 1:
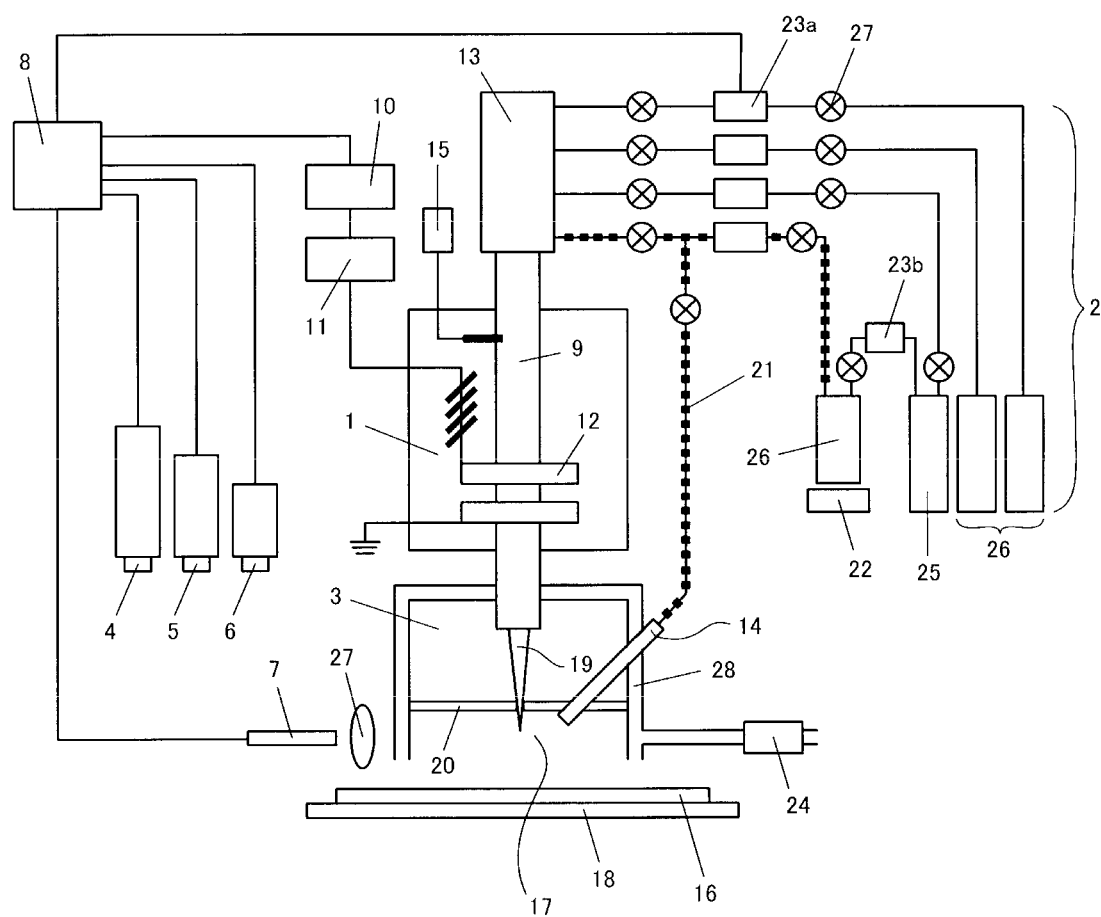
FIG. 1 is a diagram showing the configuration of the repairing apparatus according to an embodiment of the present invention.

FIG. 1 is a schematic diagram showing the apparatus for repairing a liquid crystal display device (which may hereinafter sometimes be referred to as repairing apparatus) according to the first embodiment of the present invention.

The repairing apparatus in FIG. 1 is, roughly, formed of a local plasma generating portion 1 for repairing a defect, a gas supplying portion 2, a plasma reaction portion 3, a laser 4 for microscopic processing, an application mechanism 5, a camera 6 for detecting a defect, a measuring mechanism 7 for monitoring the condition of the plasma, and a control portion 8.

The plasma generating portion 1 is formed of a tubule 9 for generating plasma made of a dielectric body, such as of crystal, and an electrode 12 provided in the outer peripheral region of this tubule 9 which supplies high-frequency power from a high-frequency power supply 10 via a matching network 11. As a concrete example, a crystal tube having an inner diameter of 1.5 mm and an outer diameter of 3.5 mm can be used as the tubule 9 for generating plasma. In addition, two facing copper electrodes are formed and provided in the outer peripheral portion of the tubule 9 for generating plasma as the electrodes 12 for applying predetermined high-frequency power to the tubule 9 for generating plasma from the high-frequency power supply 10 (for example a power supply of 144 MHz and 200 W). Here, the matching network 11 is automatically controlled so that waves reflected from the high-frequency power supply 10 become minimal when high-frequency power is supplied to the tubule 9 for generating plasma.

Here, as described below, a pipe 13 of the first gas supplying portion that forms the gas supplying portion is connected to one end of the tubule 9 for generating plasma, so that a first gas can be supplied into the tubule 9 for generating plasma, and the plasma is ignited using an ignition apparatus 15 after a desired high-frequency power is applied from the high-frequency power supply 10. The ignition apparatus 15 is formed so as to make contact with the outside of the tubule 9 for generating plasma, so that the metal, which is the material for the ignition apparatus, is prevented from flying against the substrate as a metal impurity. In the case where plasma is generated using a number of gases, they are supplied to the plasma reaction portion 3 through the tubule 9 for generating plasma after being mixed in the first gas supplying portion 13, in order to generate stable plasma.

In addition, a laser oscillator 4 for microscopic processing in the micrometers, a mask for controlling the form and an optical system (not shown), as well as an application mechanism 5 for applying a resin material, such as a photoresist, for a masking process on a substrate, and an monitor camera 6 for checking where there is a defect and the state after repair are installed to the side of the plasma generating portion 1. At least the laser oscillator 4 including the above described optical system, the application mechanism 5, the monitor camera 6, the plasma generating portion 1, the tubule 9, the electrode 12 for applying a high-frequency, and the plasma reaction portion 3 are an integrated mechanism for movement, so that these move together when their distance from the substrate 16 changes.

An open portion 17 is provided at one end of the plasma reaction portion 3, and one end of the above described tubule 9 for generating plasma is inserted into the plasma reaction portion 3 from the side opposite to the open portion 17. A plasma jet 19 of the first gas generated inside the tubule 9 for generating plasma is jetted toward the above described open portion 17 through the end of the tubule 9. A substrate stage 18 is provided along a line extending from the tubule 9 for generating plasma in such a state as to face the open portion 17 of the plasma reaction portion 3, and a substrate 16 is mounted on top of this.

A second gas supplying portion 14 that forms the gas supplying portion is inserted directly into the plasma reaction portion 3 so that the opening of the second gas supplying portion 14 is provided along a line extending from the above described tubule 9 for generating plasma so as to be as close as possible to the region crossing the surface of the substrate 16 to which a gas is supplied.

Here, the first gas is an inert gas, such as Ar or He, and used to create a plasma jet 19 inside the plasma reaction portion 3. In addition, the second gas is a material gas for forming a thin film, such as monosilane or TEOS, or an etching gas, such as chlorine or carbon chloride, and the type of gas which can be used in the present invention is not limited to the above described concrete examples.

Next, how defects are repaired using a TFT substrate (electronic circuit substrate for drive) of a liquid crystal display device, which is an example of the above described substrate 16, is concretely described. Here, an example where a passivation film or insulating film made of a silicon oxide film is locally formed is described.

First, an argon gas (hereinafter referred to as Ar) is used as the first gas (inert gas) for generating a plasma jet 19, and a TEOS (tetraethoxysilane) gas is used as the second gas (reactive gas) for forming an insulating film. The two gases are supplied into the plasma reaction portion through gas pipes in separate systems (first pipe 13 and second pipe 14).

Here, it is important to supply the first gas and the second gas separately, so that they react in a region close to the surface of the substrate 16, for the following reasons. That is to say, there are disadvantages, such that (1) in the case where the second gas (TEOS gas) for forming a thin film is introduced into the tubule 9 so that plasma can be generated, active species originating from the TEOS gas deposit inside the tubule 9 for generating plasma, and as a result, it becomes difficult to maintain stable plasma, and (2) the life of the active species and ions in the plasma which contribute to the formation of a thin film is short (the mean free path of active species is approximately several tens of nm under atmospheric pressure), and therefore, the properties of the active species change before the active species are transported to the surface of the substrate 16.

In order to form a thin film having the desired properties (resistance of silicon oxide film against dielectric breakdown of 500 MV/m or more) on the surface of the substrate 16 while avoiding the above described disadvantages, the Ar gas used to generate plasma and the TEOS gas used to form a thin film are supplied separately, as described above, and thus, the TEOS gas is transported to the surface of the substrate 16 using the plasma jet 19 using the Ar gas so as to contribute to the formation of a silicon oxide film.

Here, the TEOS gas used as the second gas is liquid at room temperature. Therefore, the TEOS gas is supplied using an inert gas, such as Ar gas, to bubble the TEOS tank. At this time, it is necessary to mount a heater 21 with a temperature adjustor in the pipe, so that the temperature of the pipe remains at approximately 100° C., in order to prevent the TEOS gas from attaching and depositing inside the pipe, before the TEOS gas reaches the inside of the plasma reaction portion 3 through the pipe 14 from the TEOS gas tank. Furthermore, it is effective, in order to efficiently supply the TEOS gas, to keep the temperature of the TEOS gas tank itself at approximately 100° C. using a heating mechanism 22 or the like.

The flow amount of the Ar gas for generating plasma and the TEOS gas for forming a thin film is controlled by mass flow controllers 23a (hereinafter referred to as MFC) installed in the respective pipes. The inert gas (here, Ar gas) used to bubble the TEOS gas is controlled using an MFC 23b and supplied into the plasma reaction portion 3 together with the TEOS gas. Here, ¼ inch pipes made of stainless steel are used as the pipes and squeezed using a ⅛ inch pipe inside the plasma reaction portion 3, so that the second gas can be supplied to a limited area in the vicinity of the surface of the substrate 16.

The TEOS gas supplied into the plasma reaction portion 3 is processed in a gas discharging installation and a detoxifying installation for reactive gases (not shown) via the gas discharging mechanism 24, which is connected to the plasma reaction portion 3, and adjusting the pressure within the plasma reaction portion 3. In addition, in order to prevent the pressure within the plasma reaction portion 3 from lowering as a result of the open portion, at least one gas discharging mechanism 28 installed around the open portion, or a combination of the gas supply and gas discharging mechanism, collects used gas flowing out from the plasma reaction portion 3, which is then processed and disposed of using the gas discharging mechanism 24h.

Next, the method for controlling local plasma used in the repairing apparatus according to the present invention is described.

In FIG. 1, an Ar gas, which is a gas for generating plasma, is introduced into the tubule 9 for generating plasma from the first gas supplying portion 13 at a rate of 1 L/min. In addition, power of 100 W is applied to the electrode 12 from the high frequency power supply 10 via the matching network 11. The Ar gas is converted to plasma using the ignition apparatus 15. In the case where large waves reflect toward the high-frequency power supply 10, making plasma discharge unstable, the system is adjusted using the matching network 11, so that the reflected waves become minimal. This adjustment is necessary before and after plasma is generated, directly after the application of a high frequency. It is possible to match the high frequency by adjusting the condenser in the matching network 11, and a mechanism for automatic adjustment for monitoring the values of traveling waves and reflected waves is mounted in the repairing apparatus.

The state of discharge in the plasma is observed through a window for monitoring (not shown) provided in the plasma reaction portion 3 using a measuring apparatus 7. This is possible by analyzing the light emission in the plasma in a range from 250 nm to 900 nm using a spectrometer, for example. In the present embodiment, light lines of light emission from Ar at 696 nm and 750 nm are measured, and the stability of the plasma is determined from the state of ionization. It is also possible to monitor the temperature of the substrate 16 and the tubule 9 for generating plasma, so that the plasma can be controlled on the basis of the data, by measuring the inside of the plasma reaction portion 3 using an infrared ray sensor which is sensitive to the wavelength region of 5 μm 15 μm, though this is not shown here.

Under the above described conditions for discharge, an Ar plasma jet 19 of approximately 10 mm directed toward the substrate 16 from the end portion of the tubule 9 for generating plasma is observed. The diameter of the plasma jet 19 is gradually reduced from the end of the tubule 9 as a result of plasma loss, and the diameter is approximately several hundreds of μm in the end portion of the plasma jet 19. Thus, it can be confirmed when the plasma jet 19 reaches a temperature of 660° C. or higher, at which the aluminum wires formed on the substrate 16 melt, under these conditions. It can also be confirmed when the temperature of the plasma jet 19 is lower the farther away from the tubule 9 for generating plasma by monitoring the temperature of the substrate 16 using the above described infrared ray sensor.

Furthermore, in the case where the flow amount of the Ar gas is increased to 4 L/min without changing the high-frequency power, the length of the plasma jet 19 is 15 mm at the most. However, whether the aluminum wires on the substrate 16 are melted by the plasma jet 19 cannot be observed. It can be found through observation using an infrared ray sensor when the temperature on the surface of the substrate 16 is 250° C. or lower, and the temperature lowers when the flow amount increases.

In addition, since the power of the high-frequency power supply 10 is changed between 40 W and 200 W, the Ar flow amount is changed between 1 L/min and 7 L/min, and the distance between the plasma jet 19 and the substrate 16 is changed, the temperature on the surface of the substrate 16 can be controlled between approximately 100° C. and approximately 1400° C., which is the melt point of silicon.

In addition, heating of the substrate, which is indispensable in conventional CVD (chemical vapor deposition), becomes unnecessary. The radiation heat of the plasma jet 19 can be controlled, as described above, and thus, a high quality film can be formed without changing the temperature of the substrate (at approximately room temperature).

As concerns the diameter of the plasma jet 19 generated inside the plasma reaction portion 3, it is possible to reduce the inner diameter of the tubule 9 to less than 1 mm, which is the minimum in the above. However, when the inner diameter of the tubule 9 is as small as approximately 0.5 mm, the plasma generated in the tubule 9 becomes unstable.

Figure 2A:
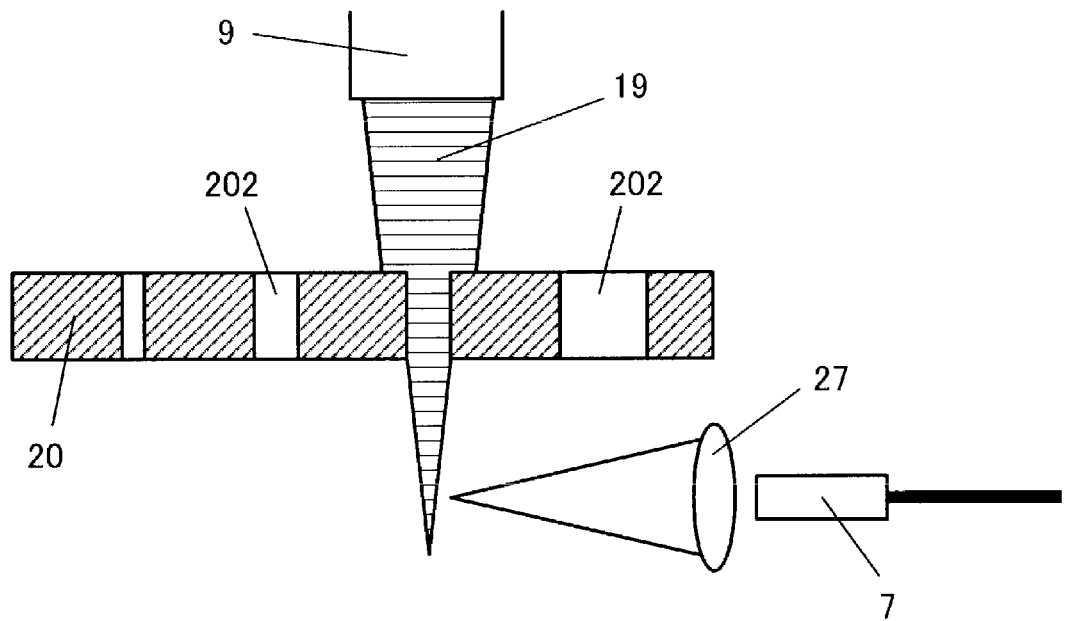
FIG. 2A is a diagram showing the configuration for making the plasma jet finely pointed using a non-contact mask according to the present invention.

Thus, control over the diameter of the plasma jet 19 using the mask 20 can be examined, as shown in FIG. 1. FIG. 2A shows the configuration of the mask 20 used in the present invention. The mask 20 is provided between the plasma jet 19 emitted from the end portion of the tubule 9 and the substrate 16. A non-metal, heat resistant material, for example a crystal plate or a ceramic, is used for the mask 20. This is because the plasma jet 19 greatly attenuates when a conductive material, such as a metal material, is used. A number of through holes 202 of different dimensions are created in the mask in order to a desirable diameter for the gained plasma jet 19. When the substrate 16 is irradiated with the plasma jet 19 through these through holes 202, the diameter of the plasma is further reduced, and the irradiated region of the substrate 16 becomes smaller, and thus, it becomes possible to control the region processed with plasma. As for the plasma emitted through the mask 20, the deviation between the axes of the mask 20 and the plasma jet 19 and the stability of the plasma jet 19 are monitored using the measuring apparatus 7 via the condenser lens 27. Here, the mask 20 is controlled using a stage or the like within the plasma reaction portion 3, so that the plasma moves to the desired through hole 202.

As a result of the diameter of the plasma being reduced as a result of the mask system, stable discharge is possible separately from the portion for generating the plasma jet 19.

Figure 2B:
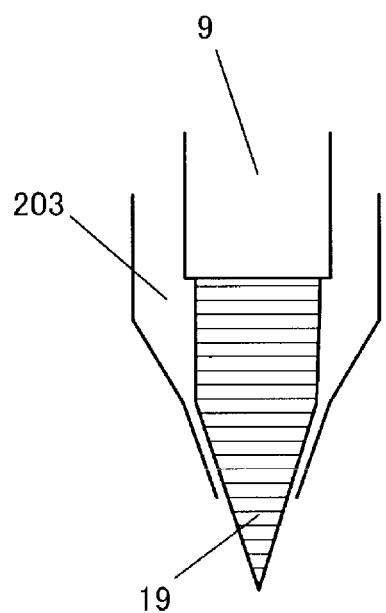
FIG. 2B is a diagram showing the configuration for making the plasma jet finely pointed using a double tube according to the present invention.

Though it is also possible to make the end portion of the tubule 9 for generating plasma thinner in order to reduce the diameter of the plasma jet 19, there are disadvantages when the diameter is reduced too much, such that the flow rate of the gas for generating plasma lowers, making it difficult to control the temperature, and the heat remains in the portion where the inner diameter is small, and as a result, impurities fly against the surface of the substrate 16 from the tubule 9 for generating plasma, and the durability of the tubule 9 for generating plasma significantly deteriorates. Though in the above, a mask system is given as an example of a method for separating the discharge portion from the diameter reducing portion, as shown in FIG. 2B, a double pipe structure where the tubule 9 for generating plasma is provided with an outer periphery tubule 203 for squeezing the plasma jet 19 around the tubule 9 may be provided. In this case, the structure allows Ar gas or the atmospheric gas in the plasma reaction container 3 to flow through the outer periphery tubule 203 independently of the gas for generating plasma, and thus, a gas flows through the outer periphery tubule 203 together with the gas which flows through the tubule 9, so that temperature of the plasma jet 19 lowers.

The above described repairing apparatus, shown in FIG. 1, is used to form an insulating film (silicon oxide film) from an Ar gas and a TEOS gas. In this example, a glass substrate is used as the substrate 16, and as concerns the conditions for film formation, the power of the high-frequency power supply 10 is 70 W, the flow amount of the Ar gas supplied to the tubule 9 from the first gas supplying portion 13 is 3 L/min, and the amount of TEOS gas supplied in a region in the vicinity of the surface of the substrate 16 from the second gas supplying portion 14 is adjusted to 0.1 L/min by controlling the flow amount of the Ar gas used to bubble the TEOS gas using the MFC 23b. The distance between the tubule 9 for generating plasma and the surface of the substrate 16, that is to say, the length of the Ar plasma jet 19, is approximately 15 mm, and the system is adjusted so that the end portion of the plasma jet makes contact with the substrate 16. It can be confirmed through observation using an optical microscope and measurement of absorption of infrared rays when a silicon oxide film (having a film thickness of approximately 1 μm) is formed in a region having a diameter of approximately 100 μm on the surface of the substrate 16 when formed under the above described conditions.

Though it is generally believed that it is necessary to heat the substrate 16 to 600° C. or higher in advance in the case where a silicon oxide film is deposited through thermal decomposition of a TEOS gas, it is clear from the above example, through measurement using an infrared ray sensor and a thermocouple installed on the substrate 16, that it is possible to form a film when the temperature on the surface of the substrate 16 is approximately 200° C.

This is considered to be because the active species of the TEOS gas are generated in the vicinity of the surface of the substrate and adhere to the substrate, thus making it possible to form a thin film even under atmospheric pressure when the creation of the plasma jet 19 and the supply of the TEOS gas are independent of each other, and the TEOS gas is supplied directly in a region where the plasma jet 19 crosses the substrate 16. Here, the strength against insulation breakdown of the gained silicon oxide film is 800 MV/m, and thus, the insulating properties are as good as with general thermal oxide films.

As described above, it is possible to locally form a silicon oxide film on the substrate 16 by supplying a TEOS gas from the second gas supplying system in FIG. 1. Then, a CF4 gas is supplied into the plasma reaction portion 3 from the second gas supplying portion instead of the TEOS gas. The flow amount of the Ar gas, the high-frequency power, and the flow amount of the CF4 gas are approximately the same as the conditions when the silicon oxide film is formed. A glass substrate on which a silicon nitride thin film (having a film thickness of approximately 1 µm) is formed is used as the substrate 16. Here, it is desirable to use a material having excellent resistance when etched by CF4 gas for the tubule 9 for generating plasma, and a ceramic tube, such as of alumina, (having an inner diameter of approximately 1 mm) is used instead of crystal. As a result, it can be confirmed when the silicon nitride thin film formed on the substrate 6 is etched into a cone shape with a diameter of approximately several hundreds of µm.

Though in the above described example, an Ar gas is used as the gas for generating plasma, a TEOS gas is used as the reactive gas for forming a thin film, and a CF4 gas is used as the gas for etching, the gases are not limited to these. In another example, an He gas can be used as the gas for generating plasma, an SiH4 gas or an SiH2Cl2 gas can be used as the reactive gas for forming a thin film, and Cl2 can be used as the gas for etching, and thus, it is possible to use the same gases as in conventional processes for manufacturing semiconductors.

(Second Embodiment)

Next, the method for repairing a defect in a liquid crystal display device using the above described repairing apparatus according to the second embodiment of the present invention is described.

Figure 3A:
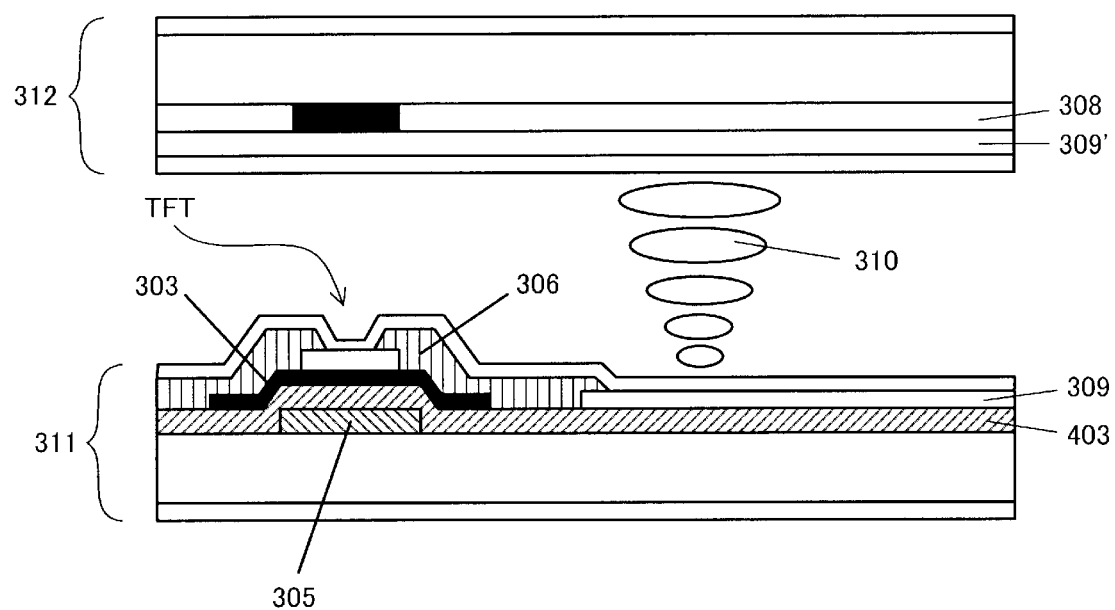
FIG. 3A is a schematic cross sectional diagram showing the configuration of a liquid crystal display device which is an object to be repaired.
Figure 3B:
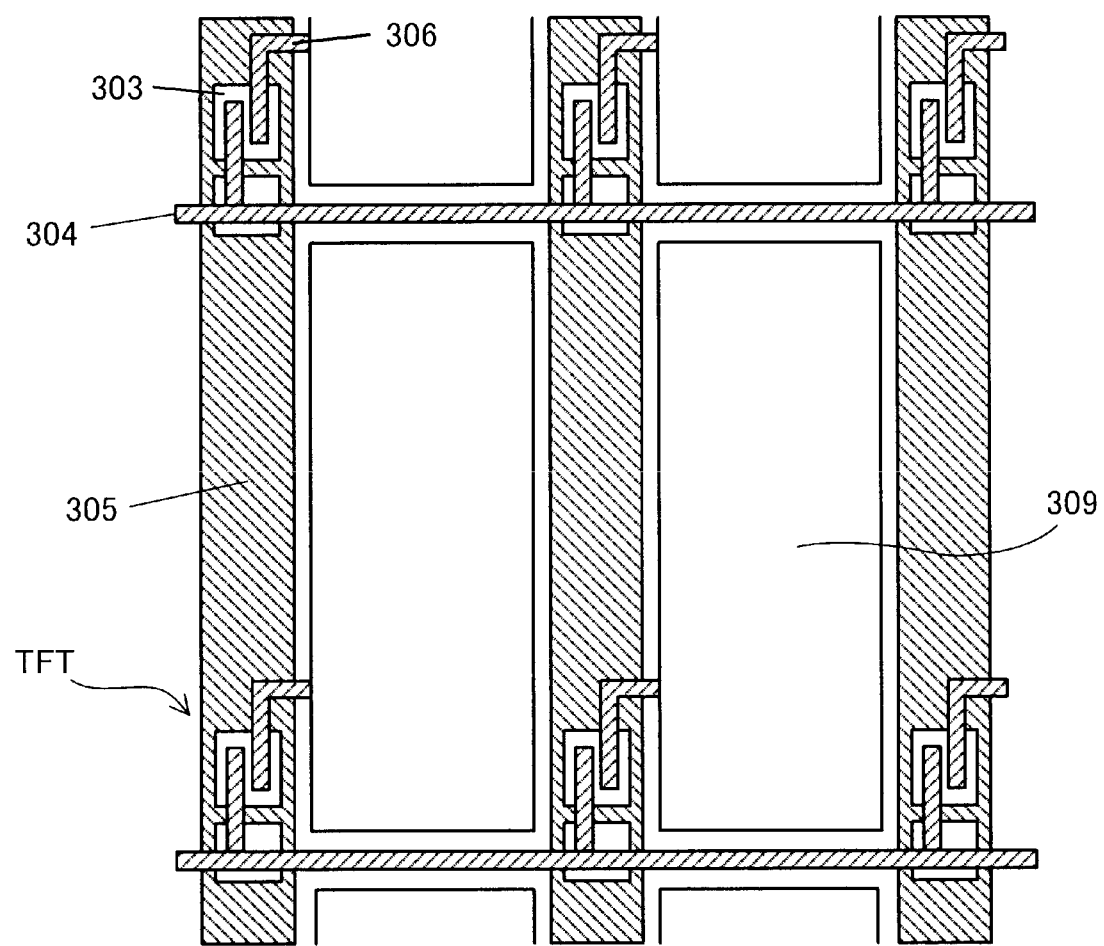
FIG. 3B is a schematic plan diagram showing pixels.

Here, the configuration of the liquid crystal display device where a defect is to be repaired is briefly described in reference to FIGS. 3A and 3B prior to the description of the method for repairing a defect. FIG. 3A is a cross sectional diagram and FIG. 3B a plan diagram showing a pixel portion.

In the configuration shown in FIG. 3A, a TFT substrate 311 where a number of pixel portions are formed and a filter substrate 312 where a number of color filters 308 are formed are provided in such a manner that the pixel portions and the color filters 308 face each other and liquid crystal 310 is sandwiched in between. In addition, as shown in FIG. 3B, gate wires 305 are formed in the above described pixel portions on the TFT substrate 311, and a gate insulating layer 403 (see FIG. 3A) is formed on top. Thus, a semiconductor layer 303 (amorphous silicon film) in island form is formed in regions where gate electrodes connected to the gate wires 305 are located above the gate insulating layer 403 (where thin film transistors TFT are formed). In addition, drain wires 304 connected to one end portion of the semiconductor layer 303 via electrodes (drain electrodes) are formed in such a direction as to cross the gate wires 305. Source electrodes 306 are formed at the other end of the semiconductor layer 303 and connected to pixel electrodes 309 made of a transparent conductive film. Regions surrounded by pairs of adjacent gate wires 305 and pairs of adjacent drain wires 304 form pixel regions.

In the thus formed pixel portions, a signal from the gate wire 305 turns on the thin film transistor TFT, so that a signal (video signal) from the drain wire 304 is supplied to the pixel electrode 309 through the thus turned on thin film transistor TFT.

The pixel electrode 309 generates an electrical field between the pixel electrode 309 and a counter electrode 309' made of a transparent conductive film formed on the filter substrate 312 side, so that liquid crystal molecules are driven.

Liquid crystal display devices having this configuration can be manufactured through a number of film formation steps (wires, semiconductor layers, electrodes) and etching steps. In this case, wires may short circuit or disconnect, or semiconductor layers may become defective, because of foreign substances getting mixed in during the manufacturing process or other problems in photo mask, and this may lead to deterioration of the properties, quality and yield in manufacture of the liquid crystal display device. Accordingly, it is important to repair defects as those described above, which may be caused in limited regions in the liquid crystal display device.

FIGS. 4A to 4D are diagrams illustrating the method for converting a defective portion to normal (repairing process) using the above described repairing apparatus, and the steps for repairing disconnection of a gate wire 305.

Figure 4A:
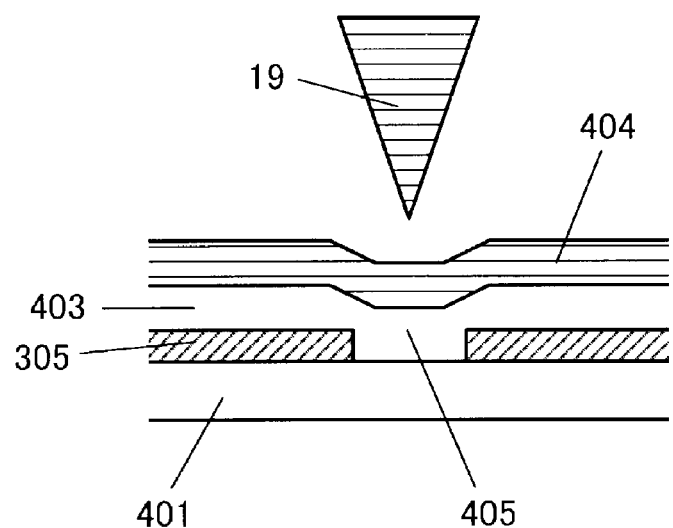
FIGS. 4A to 4D are diagrams showing steps for repairing a pattern defect in a gate wire in the TFT substrate of a liquid crystal display device.

First, in FIG. 4A, a gate wire 305 is formed from Al, for example, on a glass substrate 401 (corresponding to substrate 16 in FIG. 1). A gate insulating film 403 is formed from a silicon nitride film, for example, on top of the gate wire 305, and a passivation film 404 is formed on top either from a silicon nitride film or a silicon oxide film. In this case, it may be found out during the examination process after the formation of the gate wire 305 that foreign substances stick to the gate wire 305 during the process for forming the gate wire 305, and that there are disconnected portions 405 in the gate wire 305. It becomes impossible to supply a signal through the gate wire 305 if left as it is, and the liquid crystal display device has to be disposed of as a product having defective wires.

Therefore, the repairing apparatus using local plasma according to the present invention is used to repair the above described defective portion 405 of the disconnected wire. First, information on the defect outputted during the examination process is received by the repairing apparatus, and the stage 18 on which the substrate 16 is mounted is moved to the defective portion (defective portion 405 in the disconnected wire). The plasma reaction portion 3 according to the present invention is mounted on the repairing apparatus having a gantry structure together with a laser processing mechanism 4, an application mechanism 5 and a monitor camera 6, and provided with a moving mechanism in a uniaxial direction or a biaxial direction in the plane where the substrate 16 is placed.

During the examination process, large-scale substrates, for example 1 m squares and 2 m squares, are examined, and therefore, the resolution for detection is generally low. Accordingly, when data on the defect is received by the repairing apparatus together with the substrate 16, another picture is taken using a camera 6 with high resolution, so that the precise coordinates and the type of defect can be recognized. Reconfirmation of the defect is possible through operation by a worker, but automation may also be possible in order to shorten the time for the repair process. In order to do so, a high-resolution camera of the same level or superior to XGA (1024×768 pixels) which can recognize defects of approximately 1 µm is used, in order to make the sensitivity for the automatic recognition of defects high, and thus, the resolution is in the sub-microns. As a result, an image with high resolution can be taken, and a comparison between a normal pixel and the defective pixel, which are adjacent in a wider field of view, is possible, so that automatic recognition of the location, size and type of defect, as well as automatic repair, becomes possible. The area where the process is to be carried out is determined on the basis of the size of the recognized defect, and the mechanism using the mask 20 is adjusted so that the mask diameter is appropriate.

When a defect is recognized as the defect 405 in a disconnected wire, the substrate is moved to the plasma generating portion 3 that is offset in advance and a repair process is carried out. The plasma generating portion 3 has such a structure as to be shielded from the outside. That is to say, at least one gas discharging mechanism is provided around the plasma generating portion 3, and the structure prevents the gas in the plasma generating portion 3 from leaking out from the apparatus.

Figure 4B:
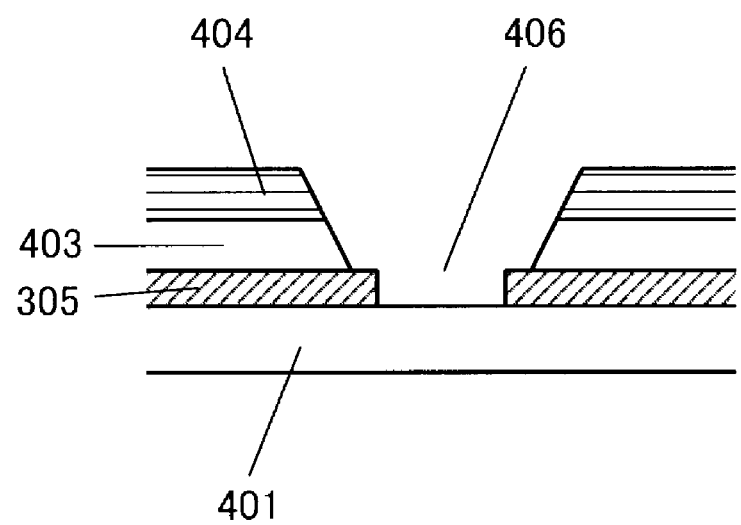

Here, a CF4 gas is supplied into the plasma reaction portion 3 from a tank 29 for an etching gas, through the second gas supplying portion 14. In addition, an Ar gas is introduced from the first gas supplying portion through the tubule 9 for generating plasma and the mask 20, the power of the high-frequency power supply 10 is turned on, and the plasma is ignited by the plasma ignition apparatus 15. Around the same time as this, reflected waves of the plasma are adjusted in the matching network 11 in which an automatic adjustment mechanism is mounted, so that the Ar plasma jet 19 becomes stable. The passivation film 404 and the gate insulating film 403, which cover the disconnected portion 405 in the wire from the top, are etched in sequence in the defective portion 405 in the disconnected wire on the substrate 16 using the reactive species of the CF4 gas in the vicinity of the surface of the substrate 16, which is excited by the Ar plasma jet 19, and thus, the surface of the glass substrate 401 is exposed, and a portion where the films are removed through etching 406 is created (FIGS. 4A and 4B). Here, it is necessary for the opening in the passivation film 404 and the gate insulating film 403 to be larger than the defective portion 405 in the disconnected gate wire 402.

Figure 4C:
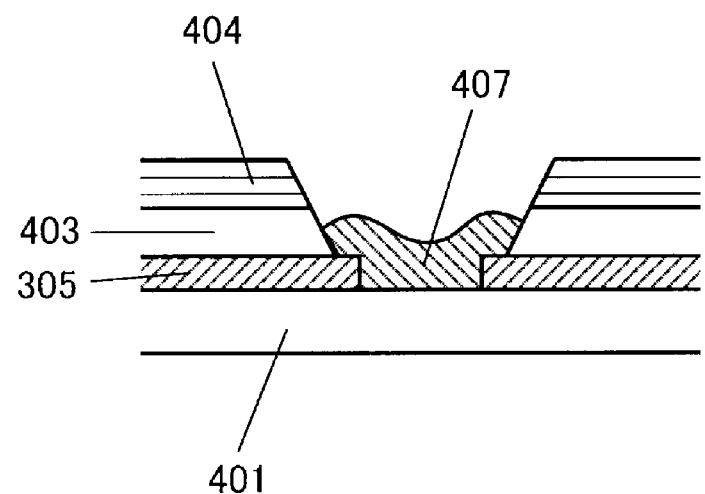

Next, as shown in FIG. 4C, the reactive gas supplied from the second gas supplying portion 14 is switched from the CF4 gas for etching to a (CH3)3Al gas (trimethyl aluminum gas), and an Al wire portion 407 is formed so as to cover the two ends of the defective portion 405 in the disconnected gate wire 305. Though a (CH3)3Al gas is used, any gas containing metals atoms of a low resistance can be used. Here, attention must be paid to the atmosphere for forming the film when a metal wire is formed. When oxygen is included, this causes oxidation, when metal atoms in the material gas form a film structure. Therefore, the atmosphere for forming a metal film is replaced with an inert gas, such as Ar or He, or a nitrogen gas. Alternatively, a reducing atmosphere, such as an H gas, may be used in order to prevent oxidation.

Figure 4D:
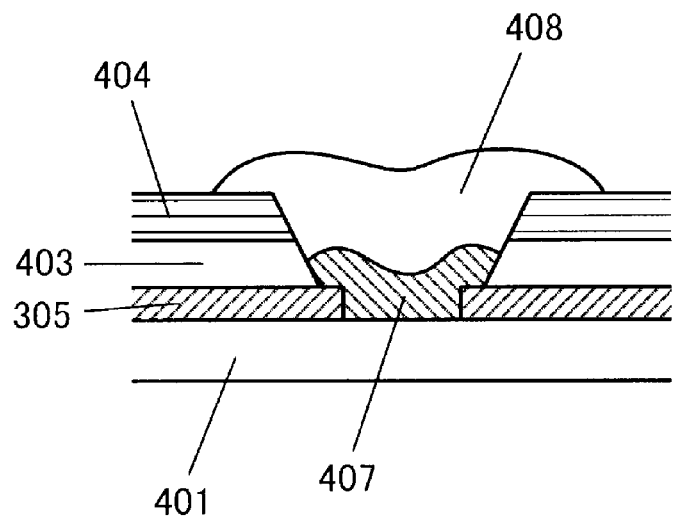

Next, as shown in FIG. 4D, the reactive gas supplied from the second gas supplying portion 14 is switched again, and an insulating film 408 is formed, so that the above described wire portion 407 is buried. The reactive gas used here is TEOS, and the insulating film 408 is a silicon oxide thin film.

Thus, the defective portion 405 in the disconnected gate wire 305, which is critical in the liquid crystal display device, is repaired using the repairing apparatus using local plasma according to the present invention, so that the original function can be recovered.

The process for repairing various defects in the process for manufacturing liquid crystal display devices, for example short-circuiting between wires (type A defects), mixing in of foreign substances between layered films, including between wires and insulating films (type B defects), and disconnection of wires, as described above, (type C defects), during the manufacturing process is described below.

Figure 5:
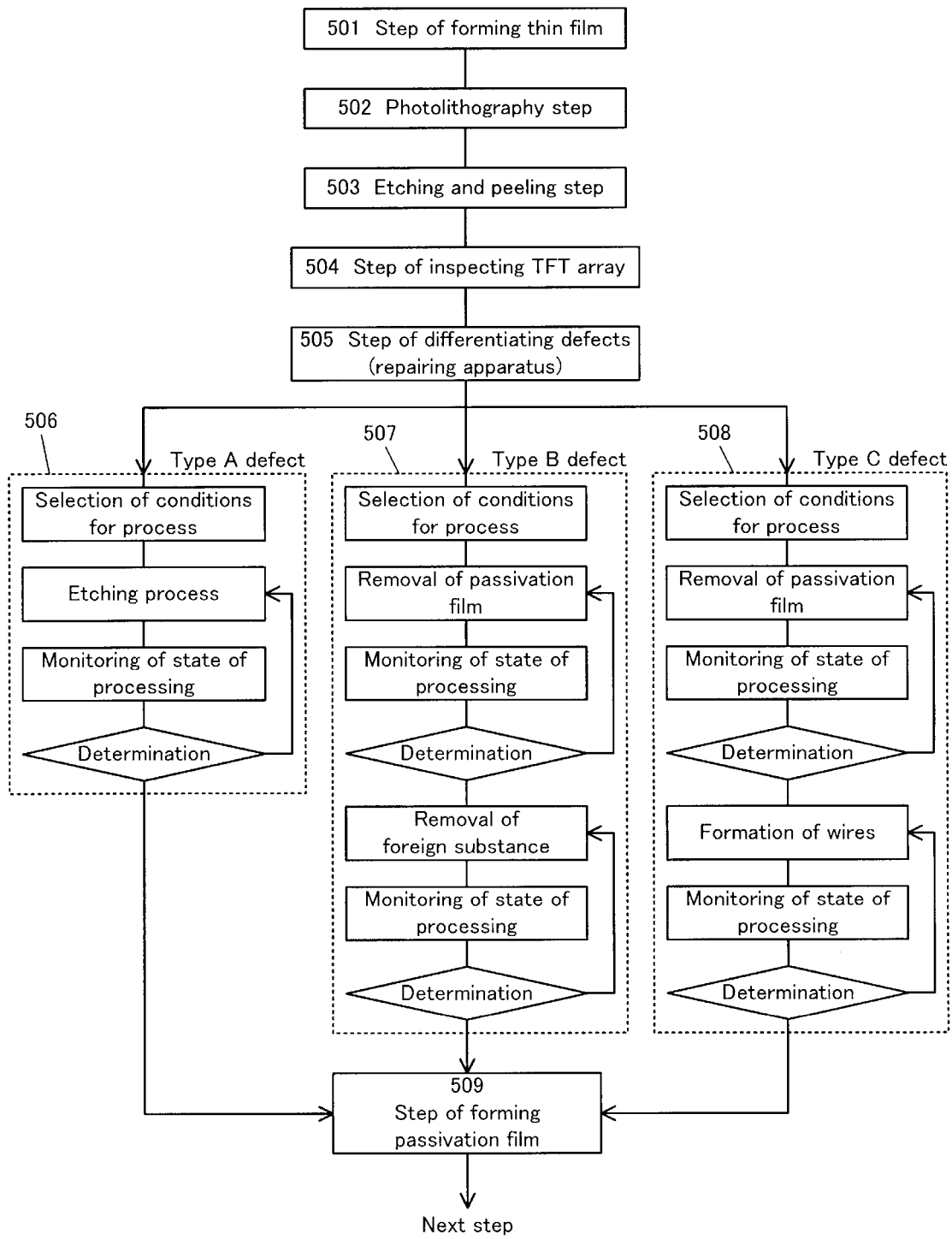
FIG. 5 is a flow chart showing a manufacturing process for the TFT substrate of a liquid crystal display device and a repairing method for various types of defects during this manufacturing process.

FIG. 5 is a flow chart showing the flow of the steps for forming a TFT substrate, as well as the flow of the examination, categorization and repair process for the defects described above. During the process for forming a TFT substrate, a desired circuit pattern and TFT's are formed through a thin film forming step 501 of forming various wires, semiconductor thin films and insulating films, a photolithography step 502, and an etching and photoresist removing step 503.

Next, defects are detected through a TFT array inspecting step 504, using an appearance inspecting apparatus and an array tester. The repairing apparatus receives information on defects detected by the above described inspection apparatus and information on the location of the defects via a network constructed along the production line. The stage on which the TFT substrate where defects are detected is mounted is driven on the basis of the information, so that the defects can be located and monitored within the optical view of the monitor camera in the repairing apparatus. After that, the defects are categorized with precision by type on the basis of the information on the color, the form in a plane, and the depth of the defects, using the image taken by the monitor camera (defect type categorizing step 505).

In order to categorize defects, the entirety of the optical system for monitoring is moved in the Z direction, perpendicular to the surface of the stage on which the TFT substrate is installed, using an automatic focusing mechanism, for example, so that the focal point can be adjusted on the surface of the TFT substrate. Alternatively, the TFT substrate may be moved in the direction of the Z axis by moving the stage. Then, information on the depth of the defect is gained from the image taken by the monitoring camera, and after that, a repair process is carried out. Alternatively, defects may be categorized by type using vertical illumination from the top, diagonal illumination, and the effects of interference in the thin film using a filter.

As a result, defects can be categorized into type A defects, type B defects and type C defects, for example, and processes for these types of defects are described below.

(Repair 506 in Case of Type A Defect)

First, in the case where a type A defect 506, which is a defect caused by short-circuiting between wires, is detected in the step of differentiating defects 505, an Ar gas is supplied to the tubule 9 for generating plasma from the first gas supplying portion 13 in the repairing apparatus shown in FIG. 1. In addition, high-frequency power is applied to the electrode from the high-frequency power supply 10, so that a plasma jet 19 is generated. The type A defect 506 is irradiated with this plasma jet 19, so that the excessive region between wires is removed. In this case, an appropriate gas for etching the wire material may be selected and supplied in the vicinity of the type A defect 508 from the pipe 14, which is the second gas supplying portion, so that the excessive wire can be etched and removed.

After that, the portion from which the wire is removed is monitored and inspected using the monitor camera, and when it is found that the removal of the wire is insufficient, it is further irradiated with the plasma jet 19 or another process is carried out under different conditions for plasma processing. In the case where it is determined that the removal of the excessive wire is sufficient, a passivation film is formed on the surface, in the vicinity of the processed wires (step of forming passivation film 509), so that the reliability of the circuit substrate increases, and the repair of the defect is completed, and thus, the TFT substrate is moved to the next step.

(Repair 507 in Case of Type B Defect)

Next, the repairing method in the case where a foreign substance mixed in between multilayer films, for example the wires and insulating films, is detected in the step of differentiating defects 505 is described. Here, an example where there is a foreign substance on a gate wire of a TFT substrate 16 (protruding defect) is given. Protruding defects are caused by splash defects, where a melted material for a metal thin film adheres to the gate wire during sputtering for the formation of a wire film, for example, or foreign substances getting mixed in at the time of film formation. In the case where the protruding defect is deep, it penetrates through the gate insulating film and the passivation film formed on top and makes contact with the transparent counter electrode formed on the color filter substrate, and thus affects the display properties, due to short-circuiting between upper and lower electrodes, or an inappropriate gap for the liquid crystal.

First, an Ar plasma jet 19 is generated in accordance with the above described method in order to remove the passivation film, which covers the foreign substance. Then, an appropriate gas for etching the passivation film is put in the second gas supplying portion 14 and supplied to the surface of the passivation film, which covers the protruding defect, so that an etching process can be carried out on the passivation film. In the case where the passivation film is a silicon nitride thin film, the gas supplied from the second gas supplying portion 14 is a CF4 gas or a C12 gas. The state of the passivation film when etched is monitored using the monitor camera 6, so that the conditions for the plasma jet 19 can be optimized. Next, the gate insulating film located in the layer beneath the passivation film is removed in the same manner. Thus, the gas supplied from the second gas supplying portion 14 is changed when the protruding defect is exposed from the surface, so that the metal-based material of the splash is etched and the above described protruding defect is removed.

Here, the second gas, which is an etching gas, is changed for each layer, in order to make the etching selective. Though in this case it is possible to collectively remove the passivation film and the protruding defect using only the Ar plasma jet 19, the material to be removed may scatter, due to the difference in material between the passivation film and the protruding defect, when greatly affected by the heat, and therefore, it is desirable to remove them separately, as described above.

After that, another passivation film is formed in the repaired portion (another gate insulating film may also be formed, if necessary) (step of forming passivation film 509), and thus, the repair of the protruding defect is completed.

(Repair 508 in Case of Type C Defect)

In the case where a protruding defect on top of a wire is repaired in the above described repair 507 of a type B defect, there is a high likelihood that a portion of the wire will be missing. When such a defect is repaired, the repair 508 of a type C defect follows, as described below.

The repair in the defective portion 405 in a disconnected wire is described in detail in reference to FIG. 4, and therefore, the process in the case where a defect in a disconnected wire (type C defect) is detected in the step of differentiating defects 505 is described here.

First, the passivation film in the region where the wire is disconnected is removed in a region which is greater than the region of the disconnected wire. That is to say, an Ar gas is supplied to the tubule 9 from the first gas supplying portion 13 in the repairing apparatus in FIG. 1, and an appropriate mask 20, which is determined through image recognition, is selected, and an Ar plasma jet 19 is formed. Then, a CF4 gas which can etch the passivation film (here, a silicon nitride thin film) is supplied from the second gas supplying portion 14, so that the passivation film is removed. How the passivation film is removed is monitored using the monitor camera 6, and in the case where etching is insufficient, an additional plasma process is carried out using the plasma jet 19 until the wire is exposed.

Next, a gas containing a metal having high conductance is supplied from the second gas supplying portion 14 instead of the CF4 gas, and thus, a wire is formed so as to cover the above described wire. After conduction is confirmed in the repaired portion of the wire, another passivation film is formed in the repaired portion, and thus, the repair of the disconnected wire is completed. The conductance can thus be confirmed by carrying out a conduction test using a probe at the two ends of the wire which is defective due to disconnection (not shown). In addition, the formation of a metal film can be confirmed from the intensity of reflection from the formed metal film in the image taken by the monitor camera 6 and an infrared ray sensor (not shown) provided along the same axis as the monitor camera 6.

As described above, the repairing apparatus according to the present invention can serve various purposes, such as removal of passivation films or insulating films, connection of wires, and formation of passivation films, in addition to removal of foreign substances. In particular, use of the invention for the TFT substrate in liquid crystal display elements makes it possible to repair critical defects in the liquid crystal display device, such as short-circuiting between wires, mixing in of foreign substances in an interlayer film, and disconnection of wires.

Though an example using a high-frequency power supply of 144 MHz is described, the present invention is not limited to this.

(Third Embodiment)

The third embodiment of the present invention relates to a process for repairing a defective portion using the same repairing apparatus as that above and a laser processing apparatus having an application mechanism for applying a resin based material, for example a resin for a contact mask, and a mechanism for microscopic processing of several µm, and irradiating a wide area of several hundred µm with a laser.

In the above described plasma jet 19, the intensity of plasma with which the substrate 16 is irradiated has a Gaussian distribution. Therefore, it is difficult to carry out a microscopic process in the micrometers with high precision, due to the distribution of the properties relating to the film thickness and the film quality from the center portion to the peripheral portion of the region irradiated with plasma. Thus, a mask process using a resin based material is used in the present embodiment.

Figure 6:
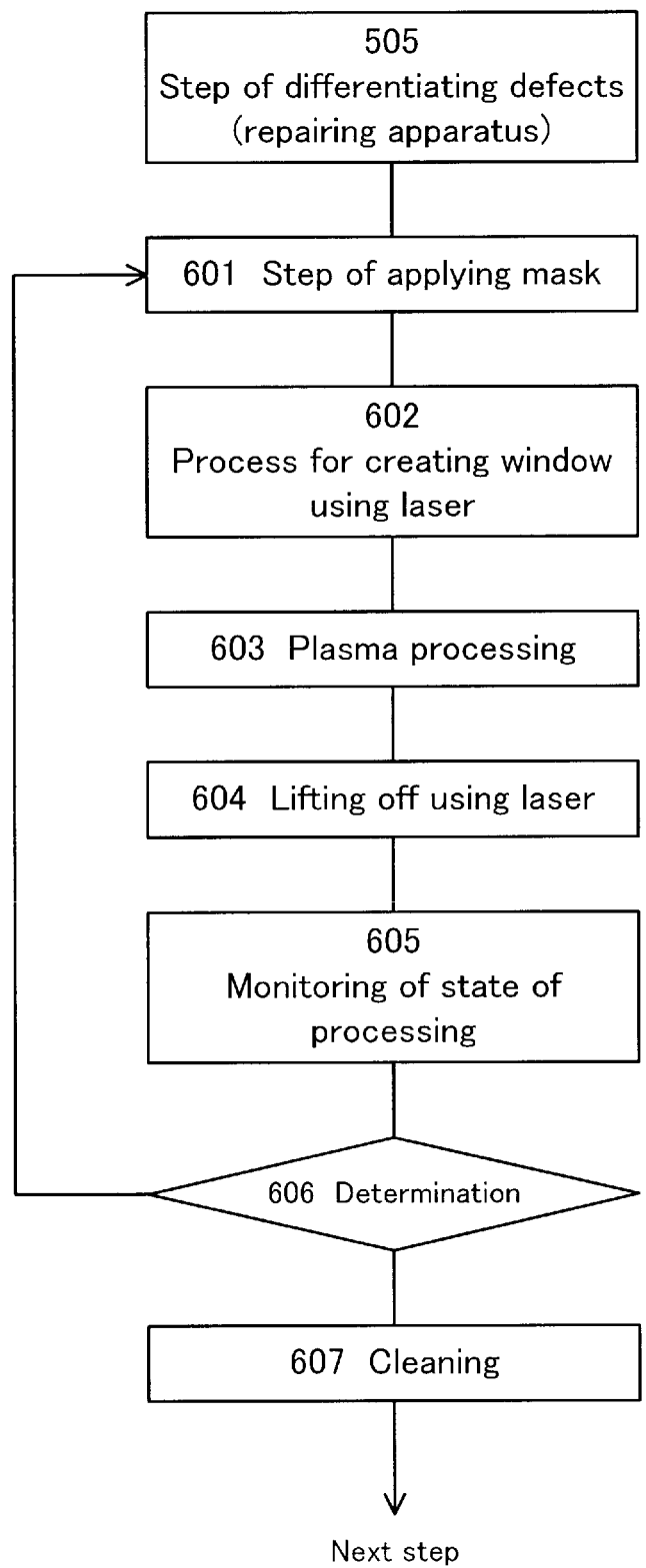
FIG. 6 is a flow chart illustrating a method for repairing a microscopic portion using a contact mask.

FIG. 6 shows a procedure for repairing a defective portion in a disconnected wire in accordance with this contact mask method. Here, an example during the process of manufacturing a TFT substrate is described. The same process as in the second embodiment is carried out, up to the step of differentiating defects 505. In the case where the defect is in the micrometers, or the precision in the dimensions greatly affect the performance, for example in a TFT channel portion, the repairing apparatus determines that the contact mask method should be used for the repair.

A method for repairing a wire during the contact mask process is described in reference to FIGS. 7A to 7C and 8D to 8F. In FIGS. 7A to 7C and 8D to 8F, plan diagrams are on the left and cross sectional diagrams are on the right (cross sectional diagrams along lines indicated by arrows in plan diagrams).

Figure 7A:
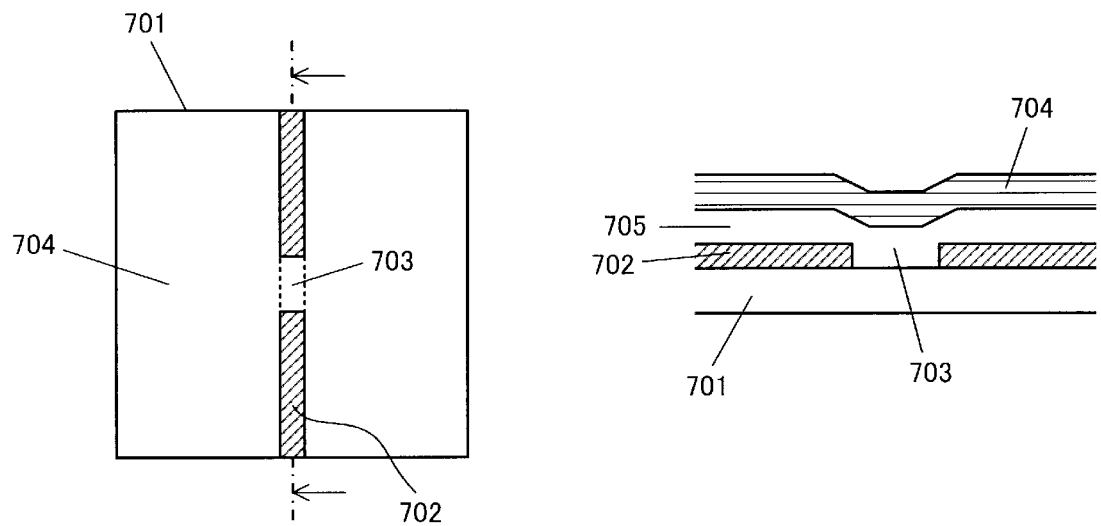
FIGS. 7A to 7C are diagrams showing steps for repairing a defect caused by a disconnected wire using a contact mask according to an embodiment.
Figure 7B:
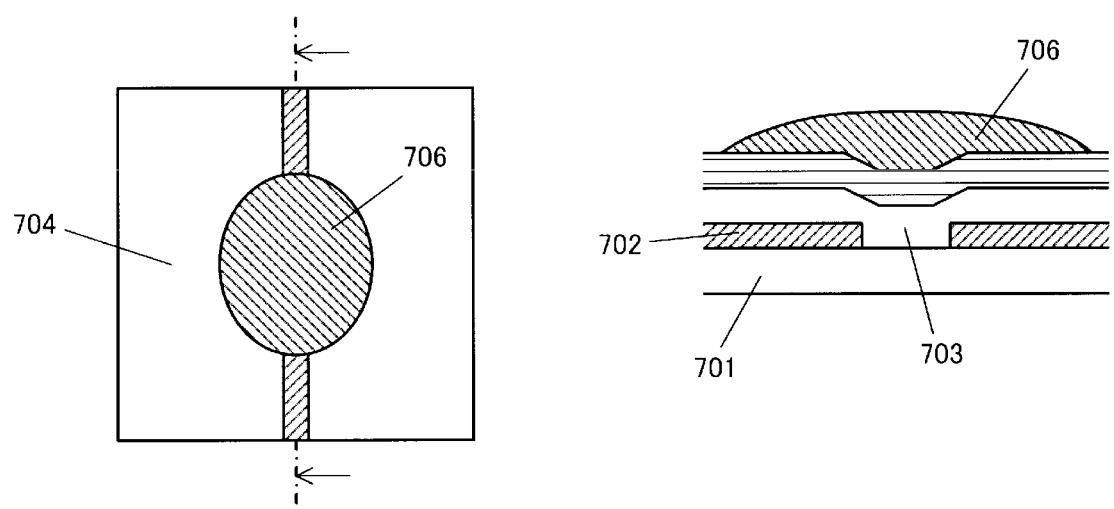

First, as shown in FIG. 7A, there is a defect 703 in a gate wire 702 formed on the substrate 701, and an insulating film 705 and a passivation film 704 are formed on top of the gate wire 702. In addition, as shown in FIG. 7B, an application mechanism 5 applies a resist material 706 over the defect 703, of which the repair requires fine precision in the dimensions in the several micrometers (application step 601). This application in a portion to be repaired needs not be precise to the point of micrometers, and the application need only cover the defect 703 in the disconnected wire. Here, a photoresist having a film thickness of approximately 1 µm and a diameter of approximately 50 µm is applied in accordance with a dispensing method. The area of application may be any, as long as it covers the region to be irradiated with a plasma jet 19, taking the irradiation region and the irradiation precision in the next step into consideration. After that, the photoresist is photo-cured with ultraviolet rays using the laser apparatus 4, or thermally set using infrared rays, and thus, a mask having a film thickness of 0.5 μm is gained.

Figure 7C:
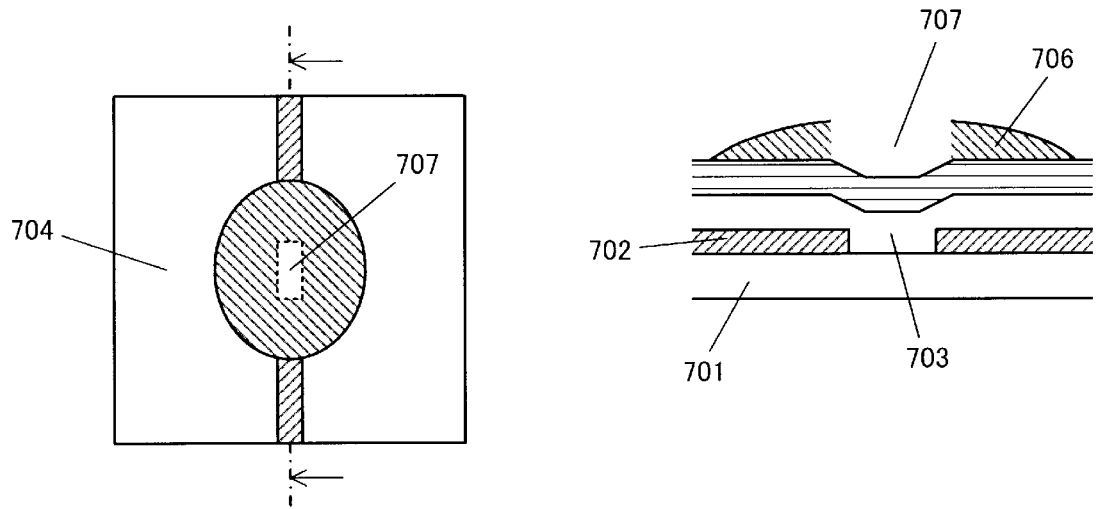
Figure 8D:
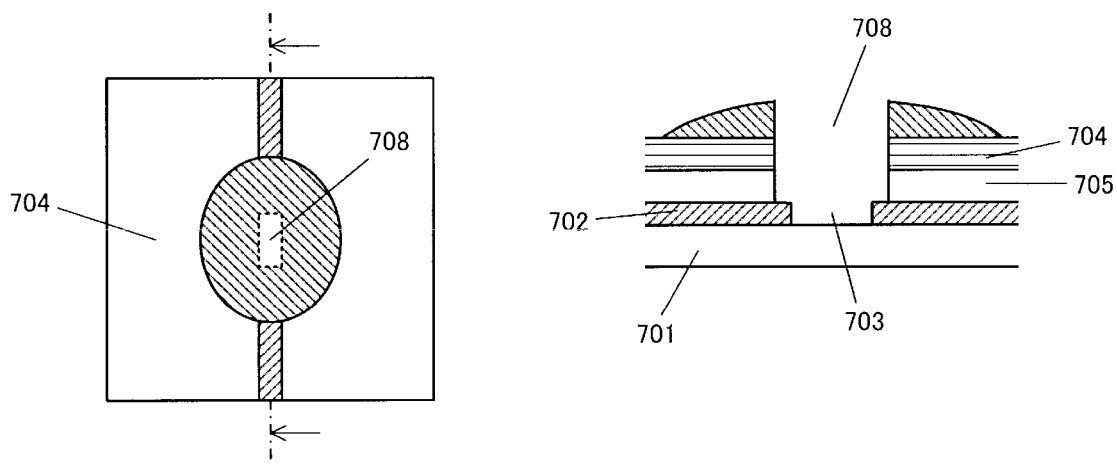
FIGS. 8D to 8F are a continuation of FIGS. 7A to 7C.

Next, the substrate is moved to the laser processing apparatus 4 and, as shown in FIG. 7C, a window is created in the resist film 706 applied over the defect 703 (laser window creating process 602), and thus, a window 707 is created. Furthermore, as shown in FIG. 8D, a window 708 is created so as to reach the passivation film 704 and the insulating film 705, so that the end portions of the gate wire 702 are exposed from this window 708. The end portions of the gate wire 702 are created in the disconnected portion caused by the defect 703. It is easier to carry out a process in the micrometers through a combination of optical systems for a laser process, than it is to use a plasma jet 19. The wavelength of the laser used here, which is an ultraviolet pulse laser, and the fourth high-frequency waves of the YAG laser, is 266 nm, and thus, the window 708 can be created through a high-precision process. In addition, there is a great difference in threshold value for processing between the photoresist 706 material used for the mask and the metal wires, the silicon nitride films and the silicon oxide films in lower layers, and therefore, it is possible to create windows without damaging the lower layers. In this process, a laser oscillator for the fourth high-frequency waves of the YAG having a wavelength of 266 nm and a pulse width of 10 nm is used, so that a process for creating a rectangular window with a laser 602 is carried out with an energy of 0.1 mJ, 10 shots and a slit width of 5 μm.

Figure 8E:
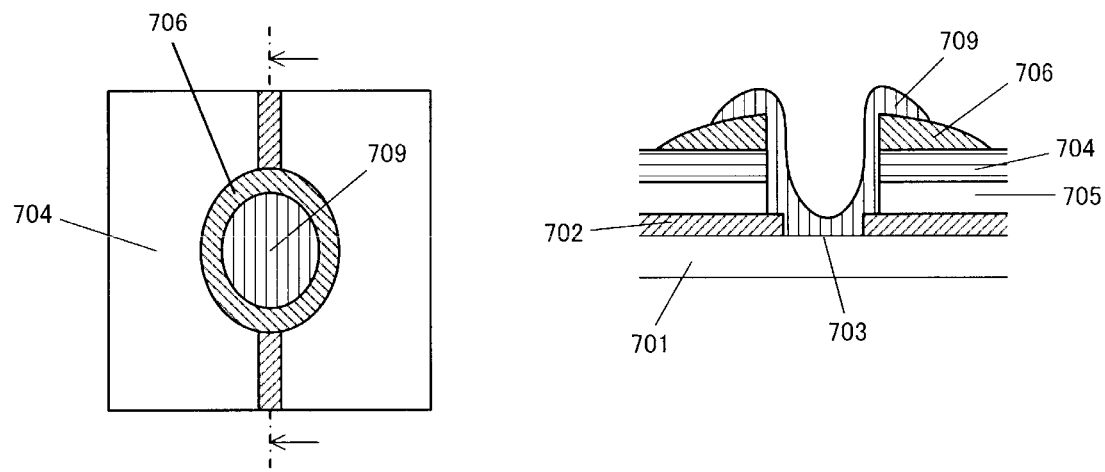

Next, as shown in FIG. 8E, the substrate with the window 708 is moved in the plasma reaction portion 3 of the repairing apparatus, and a wire film 709 is formed through the plasma jet 19. The film is formed in plasma, in the window 708 and the photoresist applied region 706. An Ar gas is introduced from the first gas supplying portion 13, so that a plasma jet 19 is generated, and a reactive gas for a metal based material is introduced from the second gas supplying portion 14, so that a metal film 709 is formed. As described above, the atmosphere is filled with an inert gas, such as Ar or He, or N2, and oxygen is removed, in order to prevent the thin film from being oxidized when a metal film 709 is deposited. Alternatively, a reducing gas, such as H, may be introduced. As a result, a metal film 709 is formed in the window 708 and the photoresist applied portion 706.

Figure 8F:
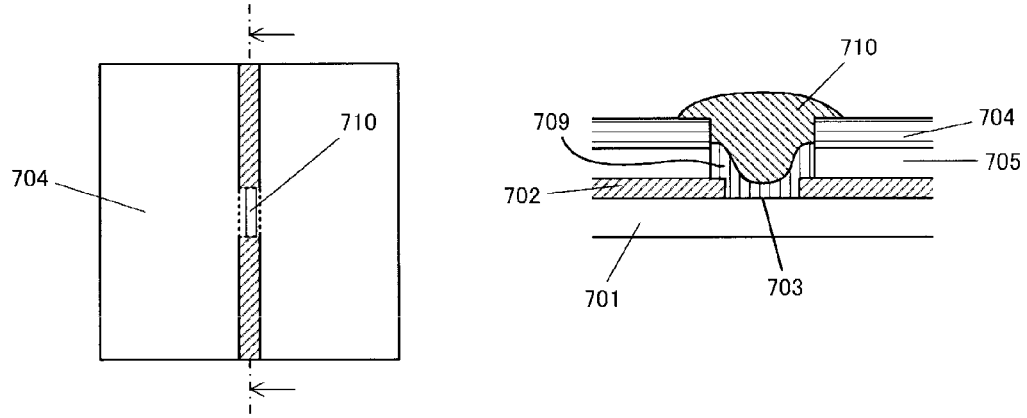

Next, the substrate is again moved into the laser processing apparatus 4 and, as shown in FIG. 8F, a removing process is carried out on the photoresist film 706 (laser lift-off step 604). Here, in order to remove the resist from the above described photoresist applied portion 706, a wide area of the photoresist applied portion 706 is irradiated with the laser, unlike in the window creating process 708. The region irradiated with a laser is in a range from several tens of μm to several hundred μm. As described above, the base layer is not damaged by the energy for the photoresist process, and therefore, there is not necessarily a resist film in the location irradiated with a laser. The metal film 709 is lifted off during this step, a new wire 709 is formed in the defect in the disconnected wire 703, and a passivation film 710 is formed, and thus, the repair is completed.

After that, approximately several % of oxygen is added to the Ar plasma jet 19 if necessary, so that a process for cleaning the surface of the substrate is carried out, and thus, the repair is completed.

Though the present invention is described using embodiments, the configurations described in the above embodiments are merely examples, and it is possible to make appropriate modifications to the present invention within such a scope as not to deviate from the technical idea. In addition, the configurations described in the embodiments may be used in combination, as long as they remain consistent.

(Fourth Embodiment)

Figure 9:
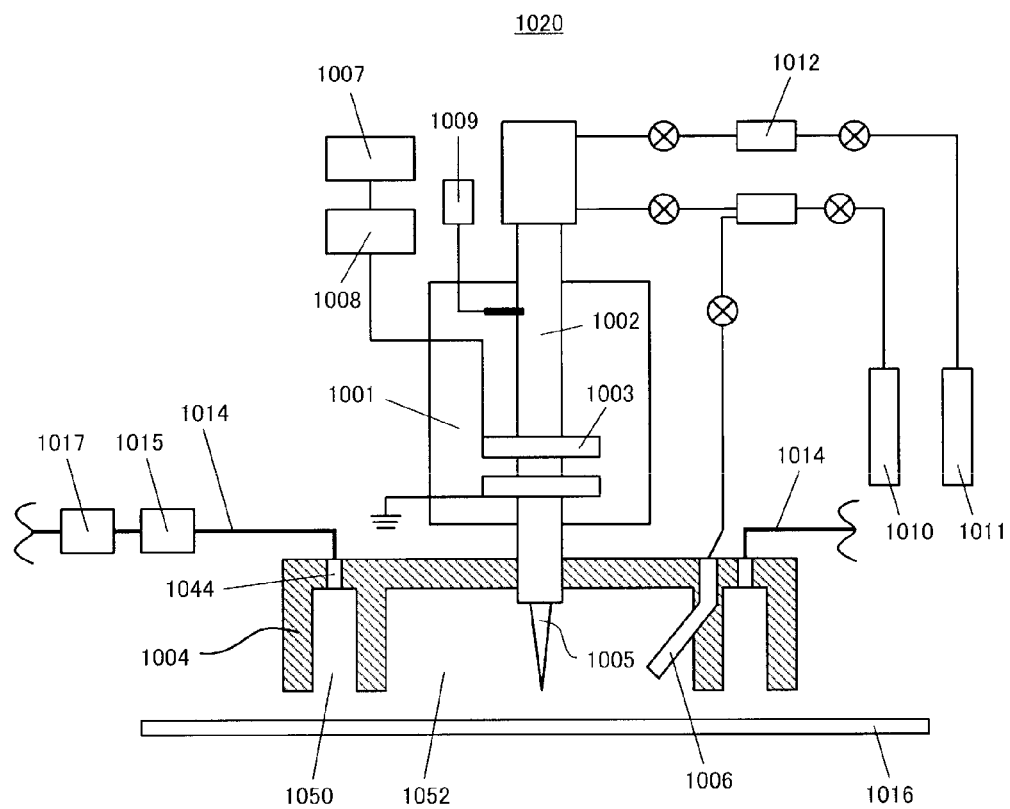
FIG. 9 is a diagram showing the local film forming apparatus according to Example 4 of the present invention.

FIG. 9 shows the configuration of a local film formation apparatus 1020. A plasma generating chamber 1001 has a crystal pipe 1002, coils 1003 which are wound around the crystal pipe 1002, and an igniter 1009 for igniting plasma, which is connected in the upper portion of the crystal pipe 1002. A high-frequency power supply 1007 and a high-frequency matching box 1008 are connected to one coil 1003, and the other coil is grounded. The lower portion of the crystal pipe 1002 passes through a through hole in the local gas sucking and discharging mechanism 1004 and protrudes into a reaction chamber 1052. A material gas and a plasma gas are supplied from a material gas container 1010 and a plasma gas container 1011, respectively, and mass flow controllers 1012 are attached in the middle of the pipes, in order to control the flow amount of the gases. The pipe for the material gas branches in front of the crystal pipe 1002, and thus it is possible for the gas to be blown out from a nozzle 1006 in the vicinity of the microplasma 1005. When the plasma is ignited by means of the igniter 1009 in such a state that a plasma gas is supplied to the crystal pipe 1002 and a high-frequency voltage is applied to the coil 1003, microplasma 1005 is generated in the end portion of the crystal pipe 1002. A film can be formed on the substrate 1016 when the microplasma 1005 reacts with the material gas. The material gas and the gas for plasma are continuously supplied through the crystal pipe 1002 and discharged from the reaction chamber 1052 after the reaction. A gas sucking inlet 1044 is created in the gas discharging chamber 1050, to which a pipe for discharging a gas 1014 is connected. The pipe for discharging a gas 1014 is connected to a gas discharging pump 1017 through a suction valve 1015. A gas is sucked out from the gas discharging chamber 1050 by means of the suction pump 1017, so that the gas discharged from the reaction chamber 1052 is taken into the gas discharging chamber 1050, and thus discharged through the pipe for discharging a gas 1014 and the suction valve 1015.

Figure 10:
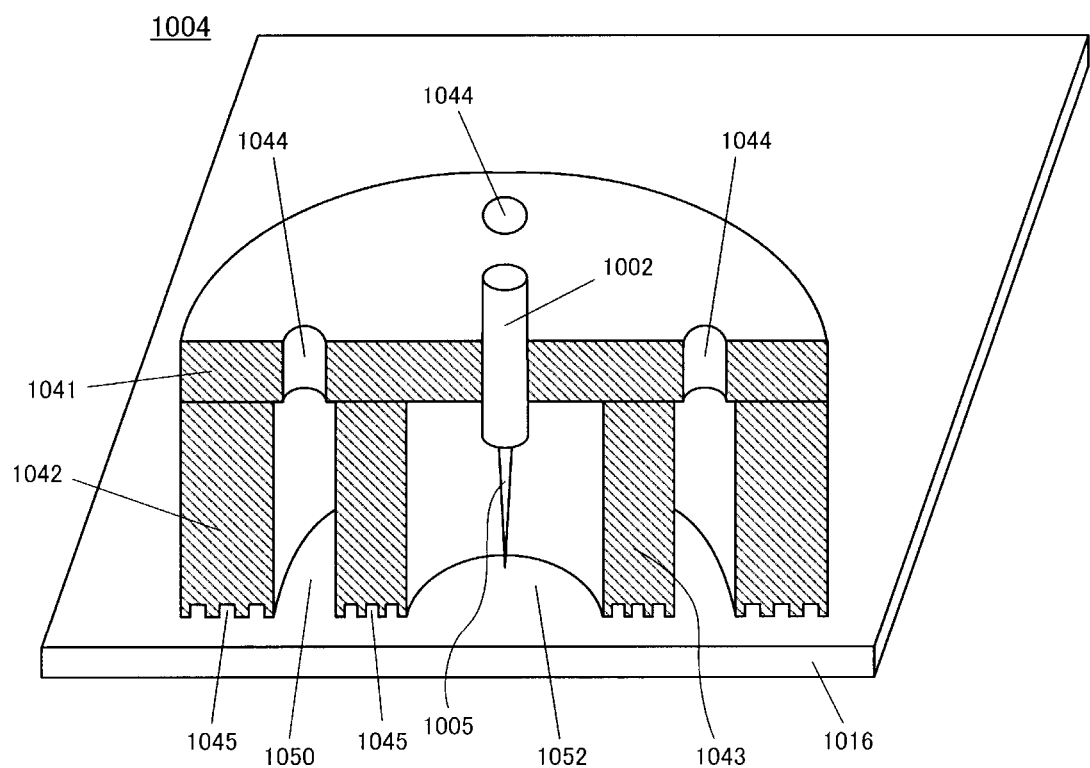
FIG. 10 is a diagram showing a local gas sucking and discharging mechanism according to Example 4 of the present invention.

FIG. 10 shows an example of the configuration of the local gas sucking and discharging mechanism 1004. The local gas sucking and discharging mechanism 1004 has an outer wall 1042 and an inner wall 1043, and the upper surface of the outer wall 1042 and the upper surface of the inner wall 1043 are joined to the bottom of an upper lid 1041, and the joint portion is sealed so as to prevent gas from leaking. A through hole through which the crystal pipe 1002 passes is created at the center of the upper lid 1041, and the joint portion is sealed, so that the gas is prevented from leaking between the through hole and the crystal pipe 1002. The crystal pipe 1002 protrudes into the reaction chamber 1052 formed inside the inner wall 1043, and microplasma 1005 is jetted out from the end portion. In addition, a gas sucking inlet 1044 is created in the upper lid 1041, in order to discharge the gas from the gas discharging chamber 1050 between the outer wall 1042 and the inner wall 1043. A plasma gas and a material gas pass between the inner wall 1043 and the substrate 1016 and enter the gas discharging chamber 1050 from the reaction chamber 1050, and then flow into the gas sucking inlet 1044. In addition, the air around the outer wall 1042 also passes between the outer wall 1042 and the substrate 1016 and enters into the gas discharging chamber 1050 and flows into the gas sucking inlet 1044. The pipe for discharging a gas 1014 shown in FIG. 4 is connected to the gas sucking inlet 1044. Though in FIG.

Figure 11:
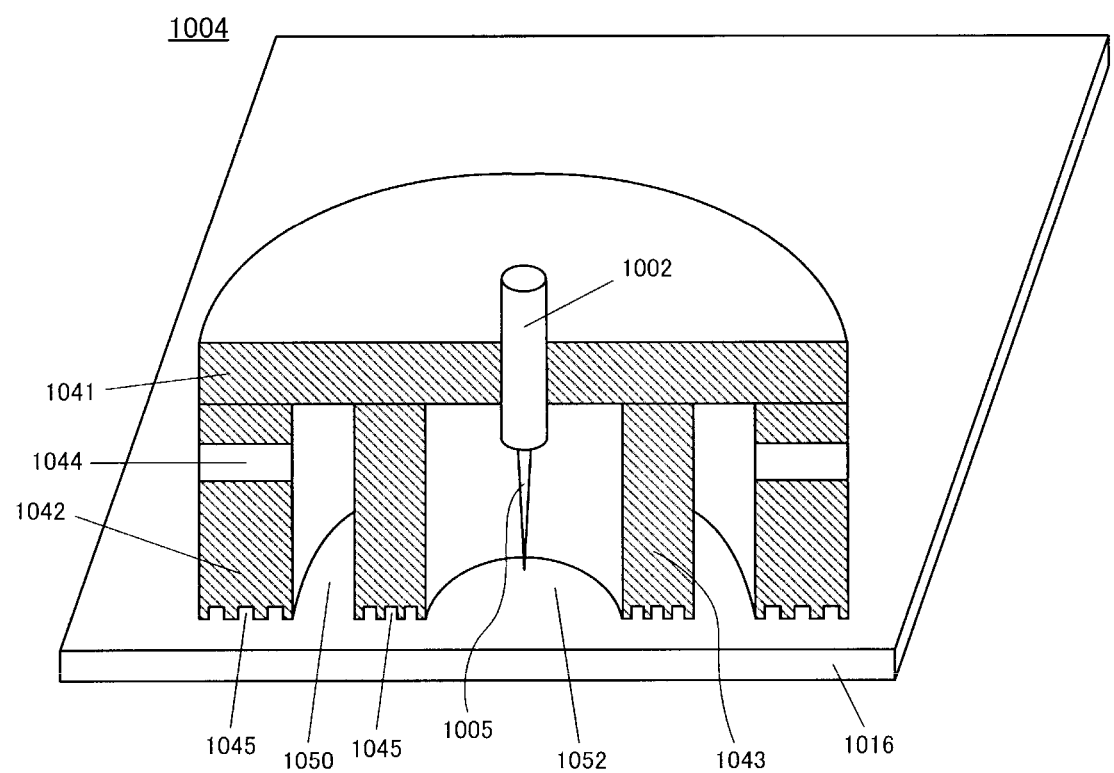
FIG. 11 is a diagram showing another local gas sucking and discharging mechanism according to Example 4 of the present invention.

10, the gas sucking inlet 1044 is created in the upper lid 1041, it may be created in the side of the outer wall 1042, as shown in FIG. 11. In the case where there are a number of gas sucking inlets 1044, there are methods for discharging a gas using suction pumps 1017 for individual inlets or one suction pump 1017 with pipes for discharging a gas 114 connected to the gas sucking inlets 1044 merging in the suction valve 1015.

The outer wall 1042 and the inner wall 1043 form a labyrinth structure 1045. In the labyrinth structure 1045, the flow path for the gas is complex, so that there is more pressure loss in the gas that flows between the outer wall 1042 and the substrate 1016, and thus, the flow amount of the gas that passes between the outer wall and the substrate is smaller. The labyrinth structure 1045 has an effect of stabilizing the flow amount of the gas, in spite of the fluctuation in the space between the outer wall and the substrate.

The local gas sucking and discharging mechanism 1004 shown in FIG. 10 has an upper lid 1041, an inner wall 1043 surrounding the center of the upper lid 1041 provided on the bottom of the upper lid 1041 in the direction of the substrate 1016, and an outer wall 1042 surrounding the inner wall 1043 provided on the bottom of the upper lid 1041 in the direction of the substrate 1016, so that a gas is introduced into a reaction chamber 1052 inside the inner wall 1042 and discharged from the gas discharging chamber 1050 between the inner wall 1043 and the outer wall 1042, and therefore, the structure allows the gas within the reaction chamber 1015 to be discharged in either direction, and the labyrinth structure 1045 is formed of the outer wall 1041 and the inner wall 1043, and thus, stabilizes the flow amount of the gas, in spite of the fluctuation in the space between the outer wall and the substrate.

Figure 12:
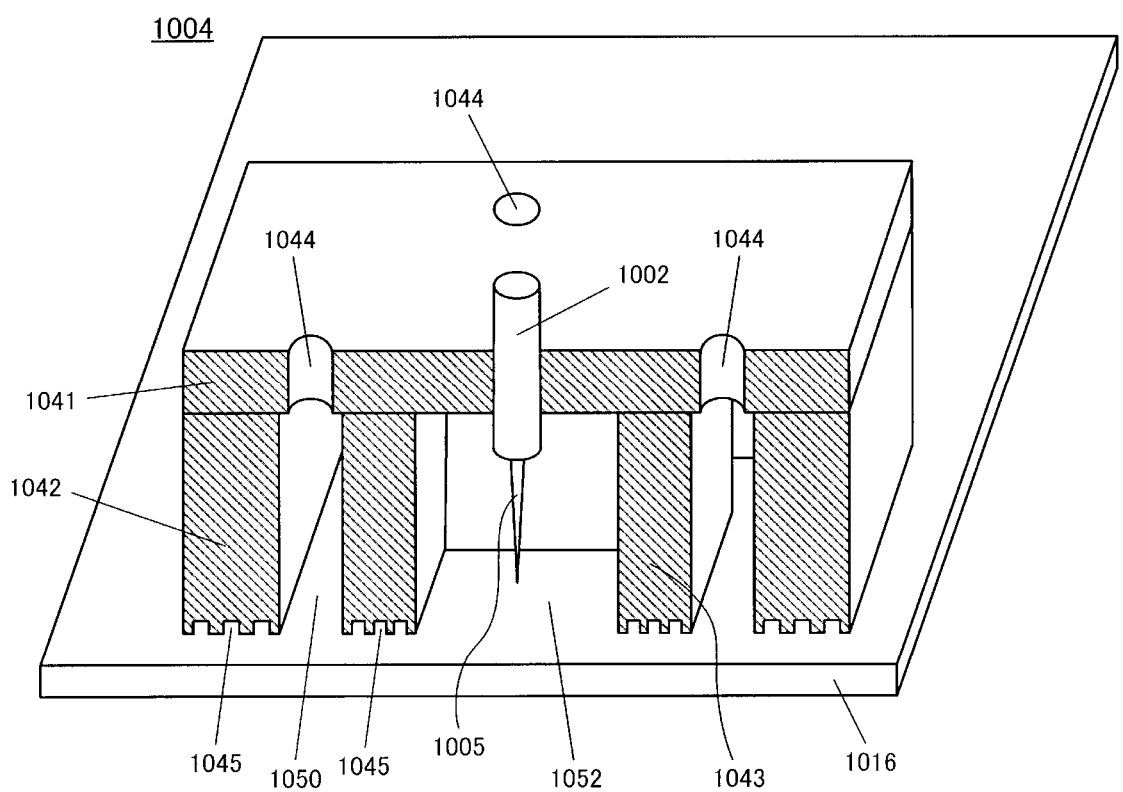
FIG. 12 is a diagram showing still another local gas sucking and discharging mechanism according to Example 4 of the present invention.

Though FIG. 10 shows an example of a structure where the outer wall 1042 and the inner wall 1043 are in cylindrical form, the two may be in rectangular parallelepiped form, as in FIG. 12. The form of the inner wall 1043 and the outer wall 1042 is square as viewed from the substrate 1016 side, and in this case also, the gas inside the reaction chamber 1052 can be discharged in either direction, and the labyrinth structure 1045 is formed of the outer wall 1042 and the inner wall 1043, and thus stabilizes the flow amount of the gas, in spite of the fluctuation in the space between the outer wall and the substrate.

Figure 13:
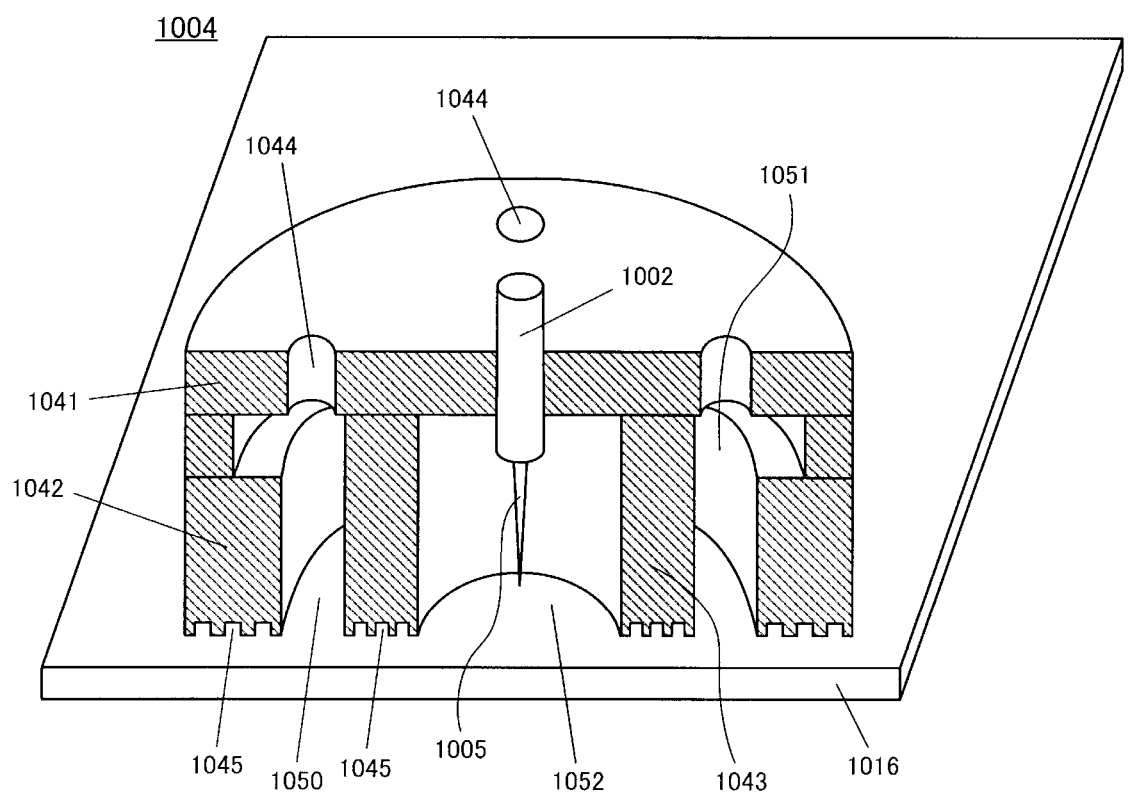
FIG. 13 is a diagram showing yet another local gas sucking and discharging mechanism according to Example 4 of the present invention.

Furthermore, the gas that flows between the outer wall 1042 and the substrate 1016 and between the inner wall 1043 and the substrate 1016 is discharged more uniformly through the gas sucking inlet 1044, and therefore, it is desirable for the structure to be as follows. First, the thickness of the outer wall 1042 and the thickness of the inner wall 1043 should respectively be uniform in the structure, in order for the length of the flow path of the gas flowing through the space to be equal both between the outer wall and the substrate and between the inner wall of the substrate. Second, in the case where there are a number of gas sucking inlets 1044, they should be symmetrically arranged around the center axis of the crystal pipe 1002, so that the pipes for discharging a gas 1014 connecting the gas sucking inlets 1044 to the suction valve 1015 have the same conductance. In the case of one gas discharging pump 1017, for example, the length of the pipes for discharging a gas 1014 is generally different between the gas sucking inlets 1044 and the suction valve 1015. Accordingly, the cross sectional area of the pipes for discharging a gas 1014, which are relatively long, may be large, and the cross sectional area of the pipes for discharging a gas 1014, which are relatively short, may be small. Third, as shown in FIG. 13, for example, a space which becomes a buffer region 1051 is provided on upstream from the gas sucking inlet 1044. When a buffer region 1051 having a greater volume than the gas discharging chamber 1050 is provided, the inconsistency in the pressure for suction through the gas sucking inlets 1044 can be reduced, and thus, it becomes possible to uniformly discharge the gas from the gas discharging chamber 1050. In this structure, there may be only one gas sucking inlet 1044.

When microplasma 1005 is generated, the temperature in the end portion of the microplasma 1005 becomes several hundred degrees, and thus, the temperature within the reaction chamber 1052 also increases. Therefore, it is necessary for the material used in the local gas sucking and discharging mechanism 1004 to be resistant to heat, and from this point of view, a metal, a ceramic or crystal is preferable. The advantage in using a metal is that the material can be processed into a complex form when a material that is easy to cut is selected. Here, the reaction chamber 1052 should be large, in order to prevent the microplasma 1005 from being affected by the conductor. Ideally, the distance between the microplasma 1005 and the inner wall 1043 is 20 mm or more. The advantage in using a ceramic is that the material is an insulator, and thus, the reaction chamber 1052 can be made small. The advantage in using crystal is that the material is an insulator and transparent. It becomes possible to attach a camera outside the local gas sucking and discharging mechanism 1004, so that the state of the microplasma 1005 when generated can be monitored, the state of the microplasma 1005 can be evaluated through image recognition, and a warning can be issued when it is abnormal, or the state of the microplasma 1005 when generated can be evaluated with a spectrometer attached, so that the applied voltage and impedance matching can be finely adjusted. These materials may be used alone or combined. A crystal window can be provided in a ceramic housing, for example.

Figure 14A:
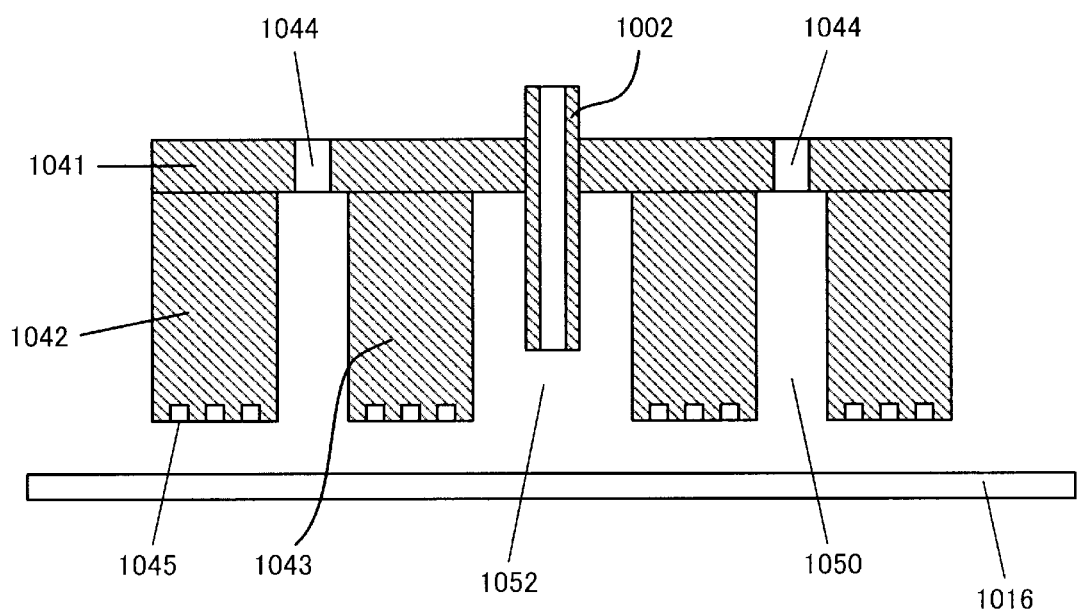
FIGS. 14A and 14B are diagrams illustrating a labyrinth structure according to Example 4 of the present invention.
Figure 14B:
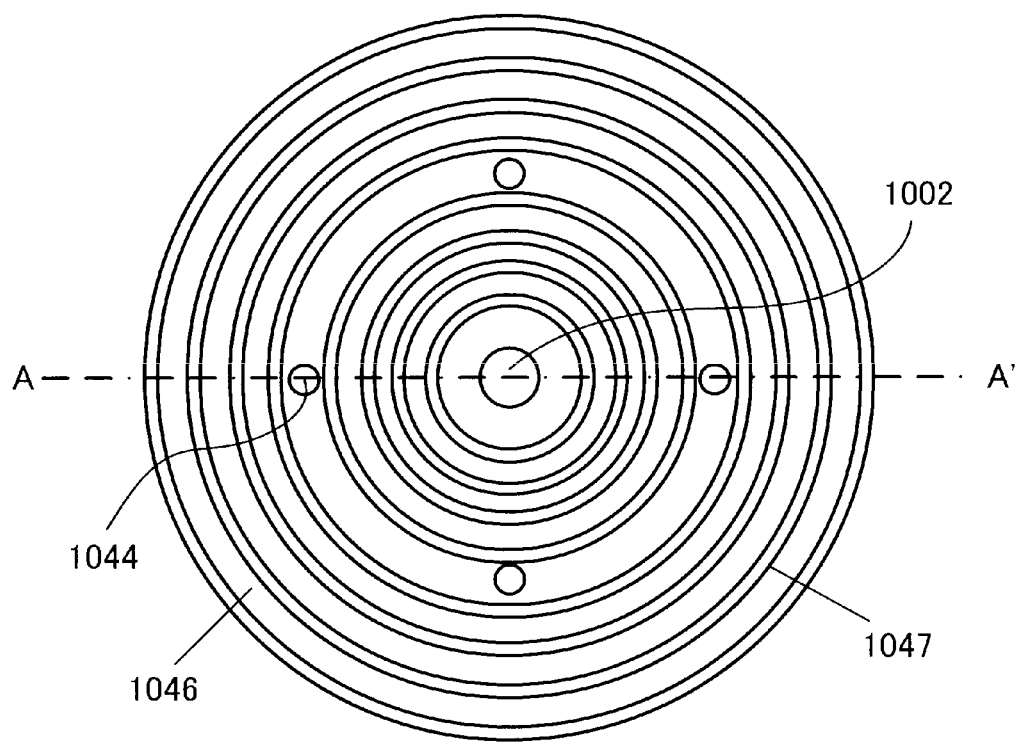

Next, the form of the labyrinth structure 1045 is described. FIG. 14B is a diagram showing the local gas sucking and discharging mechanism 1004 as viewed from the substrate 1016 side, and FIG. 14A is a cross sectional diagram along A-A' showing the local gas sucking and discharging mechanism 1004. The labyrinth structure 1045 is a complex structure of the gas flow path, where the pressure loss of the gas that flows through the space between the structure and the substrate 1016 rises, so that the flow amount of the gas that passes through the space is reduced. In the labyrinth structure 1045, a number of squeezing pieces 1047 are formed in concentric form and have a rampart shape as viewed from the side. In the following, the recesses are referred to as trenches in circular form 1046. When a gas flows through the space between the labyrinth structure 1045 and the substrate 1016, first the flow path is squeezed at the entrance by the squeezing piece 1047, and therefore, the flow rate of the gas increases. When the flow becomes faster, the reduction in pressure increases, due to the Bernoulli effect. Furthermore, the speed of the gas that flows into the trench in circular form 1046 from the squeezing piece 1047 lowers where the area of the flow path increases, and at the same time, the gas spreads and flows toward the next squeezing piece 1047. At this time, some of the gas partially an eddy in the upper portion of the trench in circular form 1046, and therefore, the resistance of the flow path increases, and pressure loss increases.

Figure 15A:
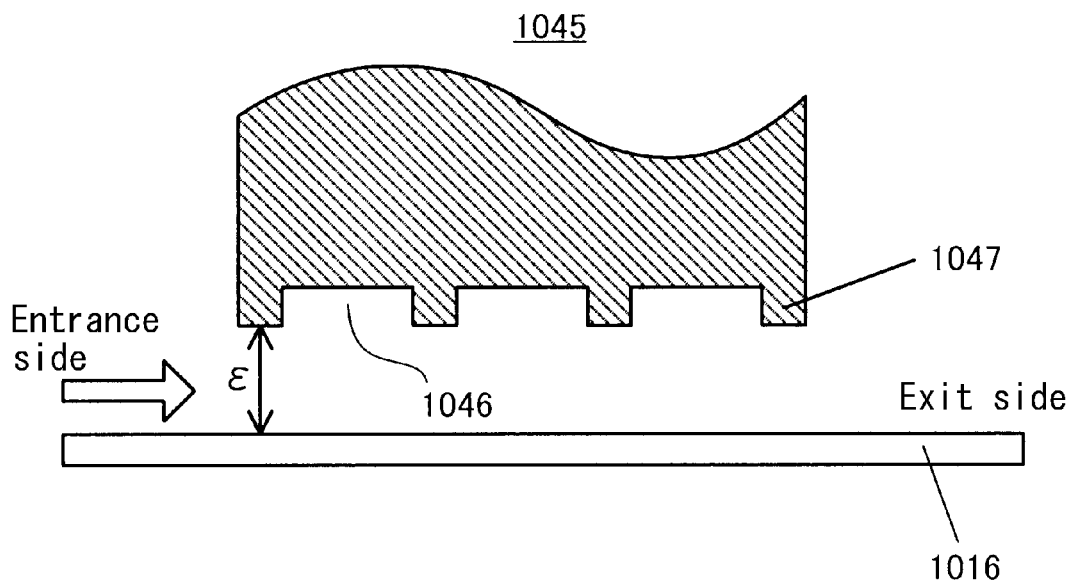
FIGS. 15A and 15B are diagrams illustrating the relationship between the space and the flow amount.
Figure 15B:
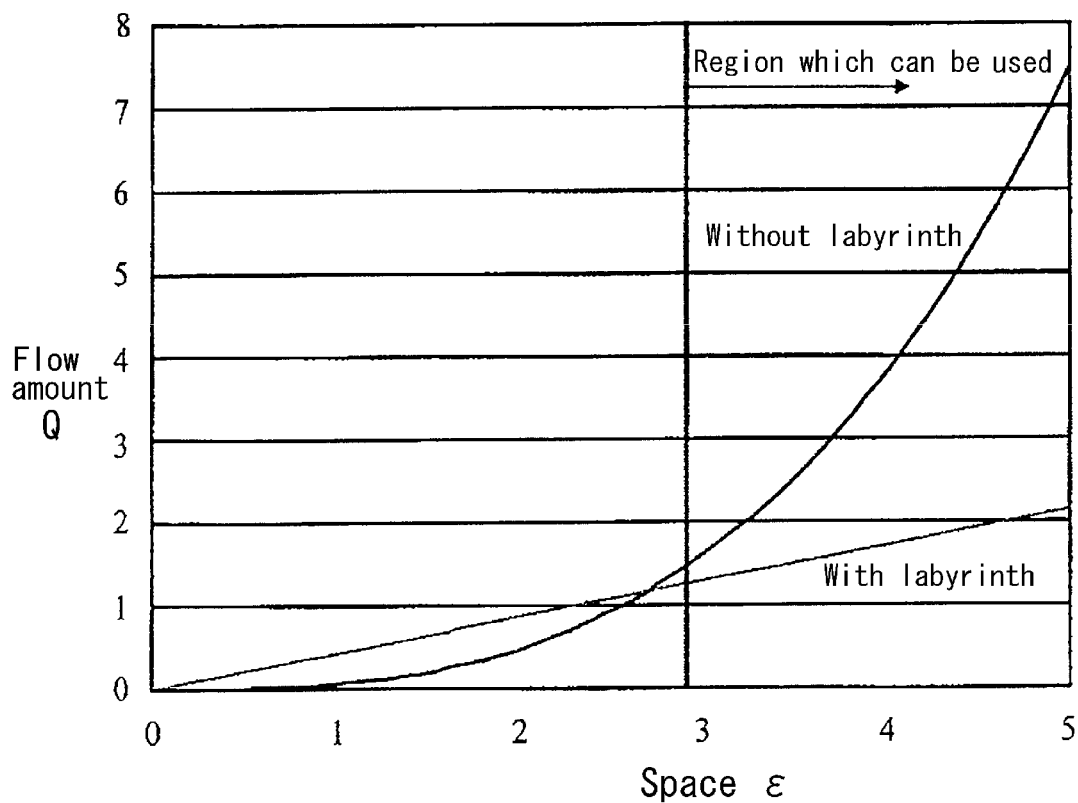

As shown in FIG. 15A, the pressure is constant both on the entrance side and the exit side of the labyrinth structure 1045, and the space between the squeezing piece 1047 and the substrate 1016 is $\epsilon$ in the labyrinth structure 1045. FIG. 15B shows the relationship between the space $\epsilon$ and the flow amount Q of the gas that flows through the space between the substrate 1016 and the labyrinth structure. For the sake of comparison, the relationship between the space $\epsilon$ and the flow amount Q in the case where no labyrinth structure 1045 is provided and the surface is smooth is shown. In the case where there is no labyrinth structure 1045, the flow amount Q is proportional to the space $\epsilon$, while in the case where the surface is smooth, the flow amount Q is proportional to the space $\epsilon$ cubed. In a region where the space $\epsilon$ can be used taking undulation of the substrate 1016 into consideration, the flow amount is smaller in the labyrinth structure 1045. In addition, the inclination of the curve is smaller in the range where the space can be used when a labyrinth structure 1045 is provided, and the fluctuation in the flow amount Q is smaller in accordance with the fluctuation of the space $\epsilon$.

Pressure loss may be greater, and thus the flow amount smaller, when there are more squeezing pieces 1047. Therefore, the amount of air that is taken in from the outside can be reduced while keeping the pressure within the reaction chamber 1052 constant, by making the number of squeezing pieces 1047 greater in the outer wall 1043 than in the inner wall 1042.

Though in this embodiment, the outer wall 1042 and the inner wall 1043 both have a labyrinth structure 1045, only the outer wall 1042 or the inner wall 1043 may have a labyrinth structure 1045. In the case where the amount of plasma gas or material gas flowing into the reaction chamber 1052 is great, it becomes easy for the gas to flow from the reaction chamber 1052 to the gas sucking inlet 1044, and thus the gas can be prevented from remaining within the reaction chamber 1052, by making it so that only the bottom of the outer wall 1042 has a labyrinth structure 1045 and the bottom of the inner wall 1043 has a smooth surface. In the case where the amount of flow of the discharged gas is great, the degree of vacuum can be kept low, due to the increase in the amount of air that can be taken in from the outside by making it so that only the inner wall 1045 has a labyrinth structure 1045 and the outer wall 1042 has a smooth surface.

Figure 16A:
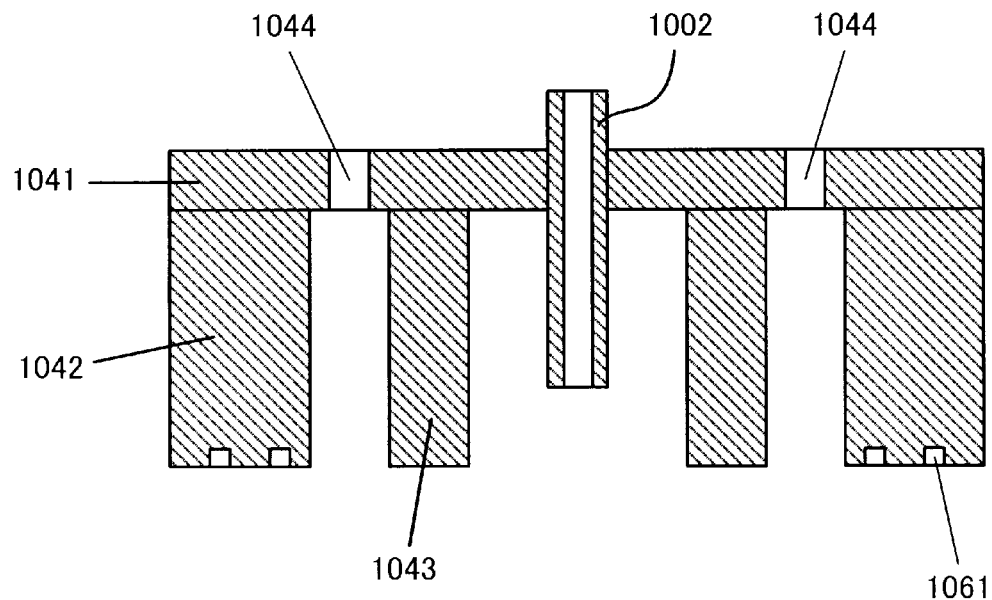
FIGS. 16A and 16B are diagrams showing another labyrinth structure according to Example 4 of the present invention.
Figure 16B:
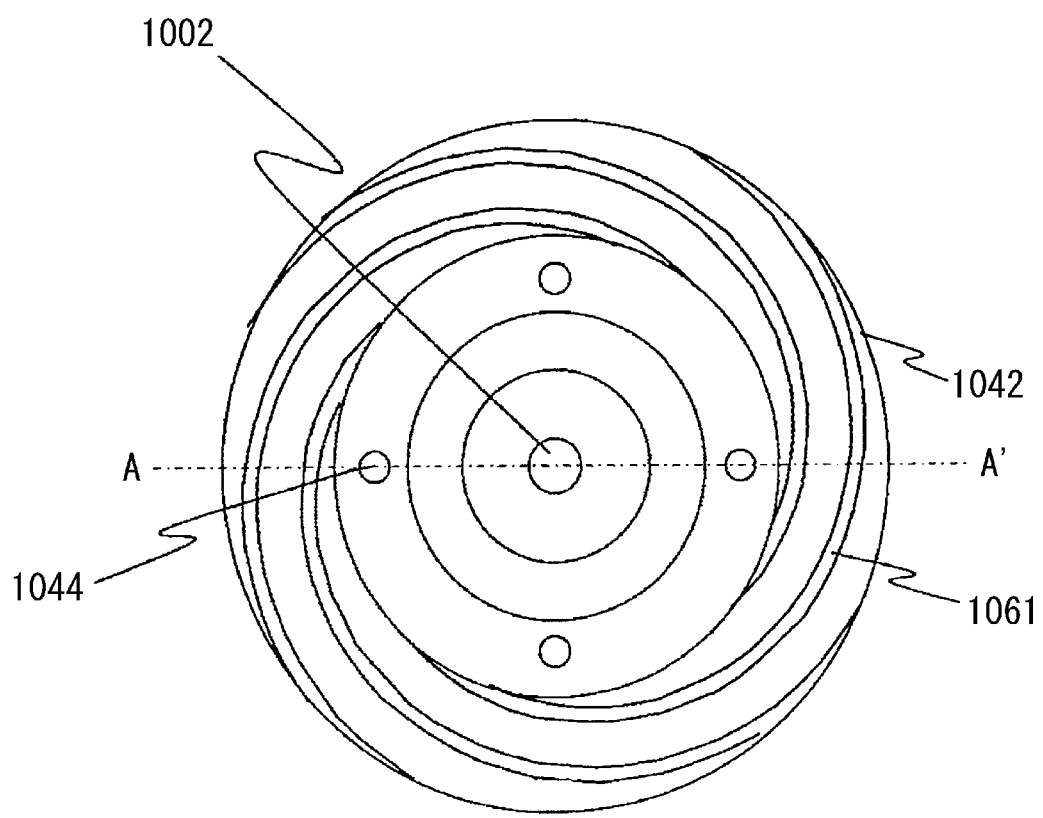
Figure 17A:
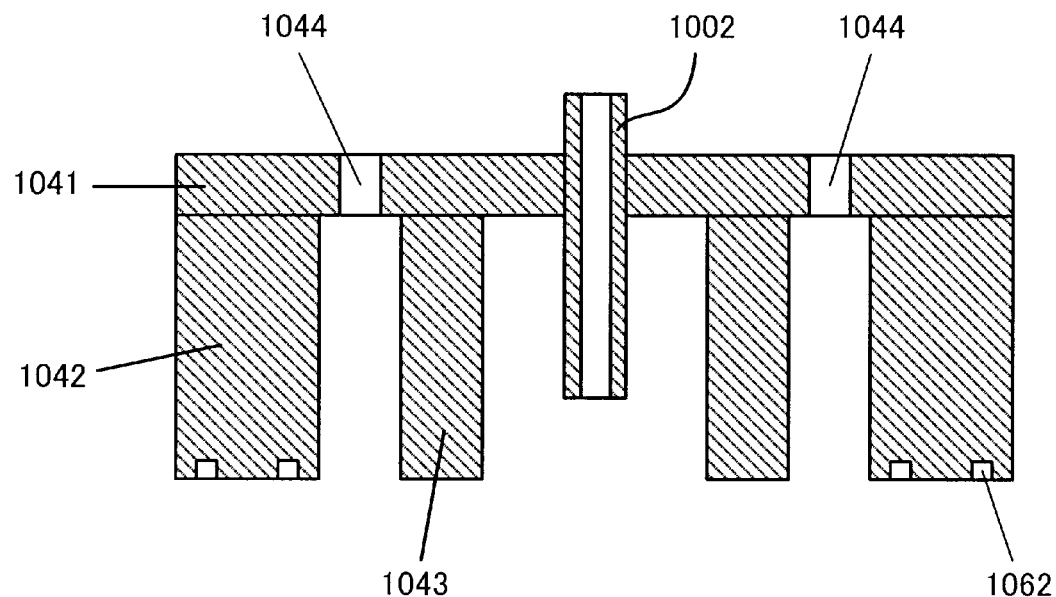
FIGS. 17A and 17B are diagrams showing still another labyrinth structure according to Example 4 of the present invention.
Figure 17B:
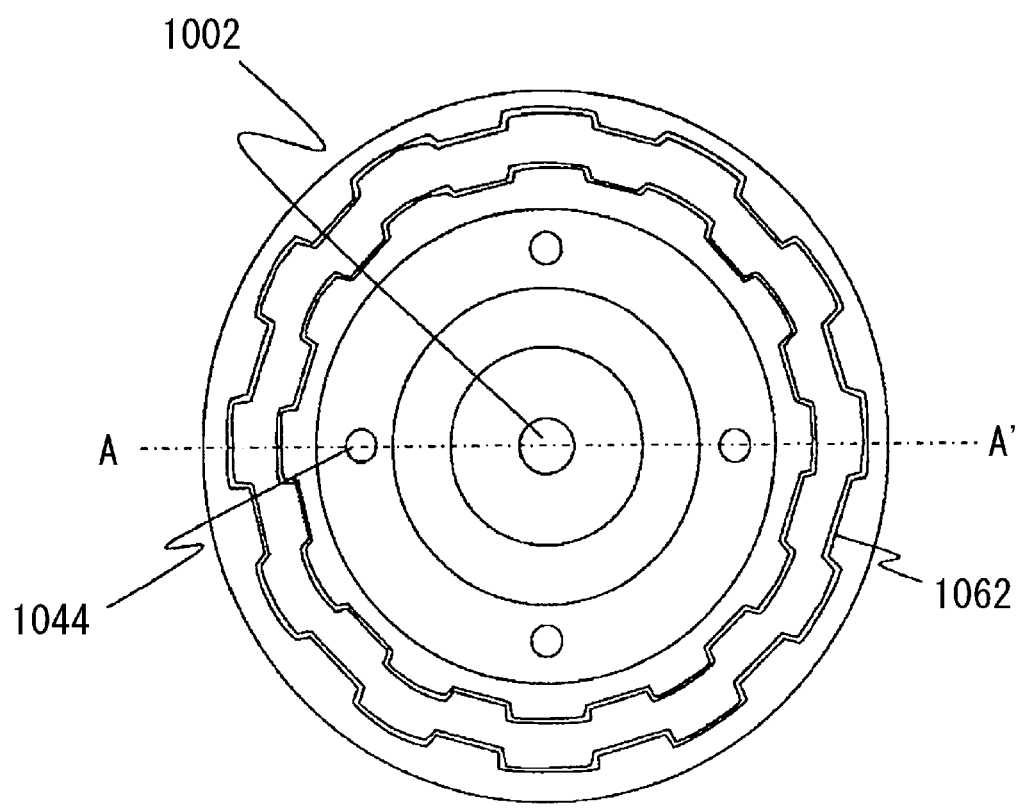
Figure 18A:
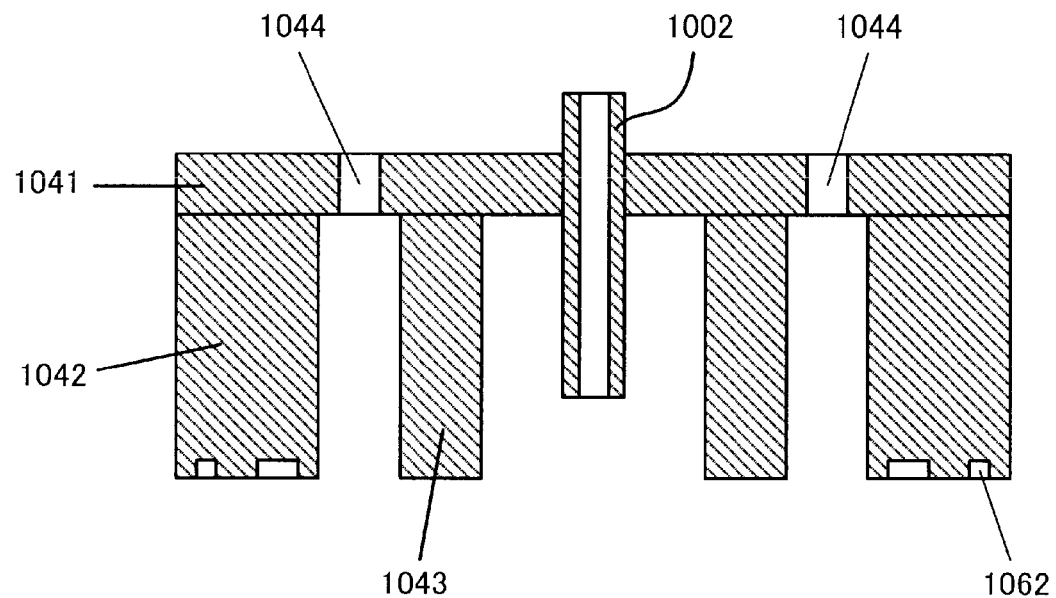
FIGS. 18A and 18B are diagrams showing yet another labyrinth structure according to Example 4 of the present invention.
Figure 18B:
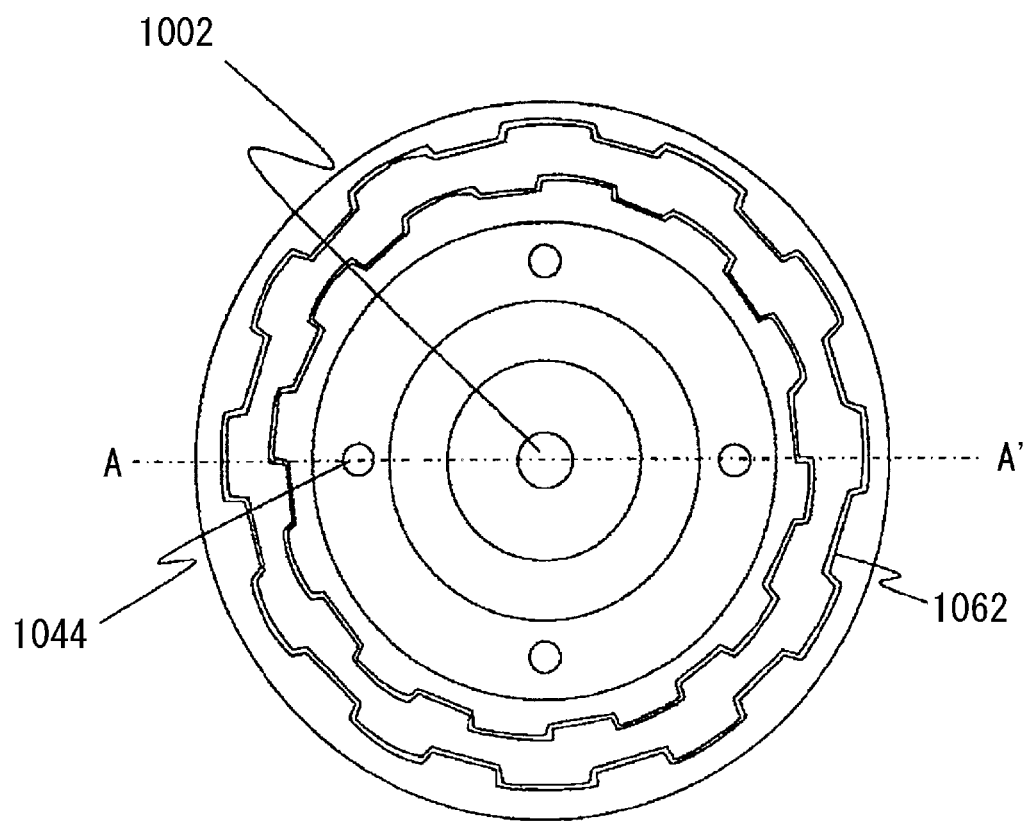
Figure 19A:
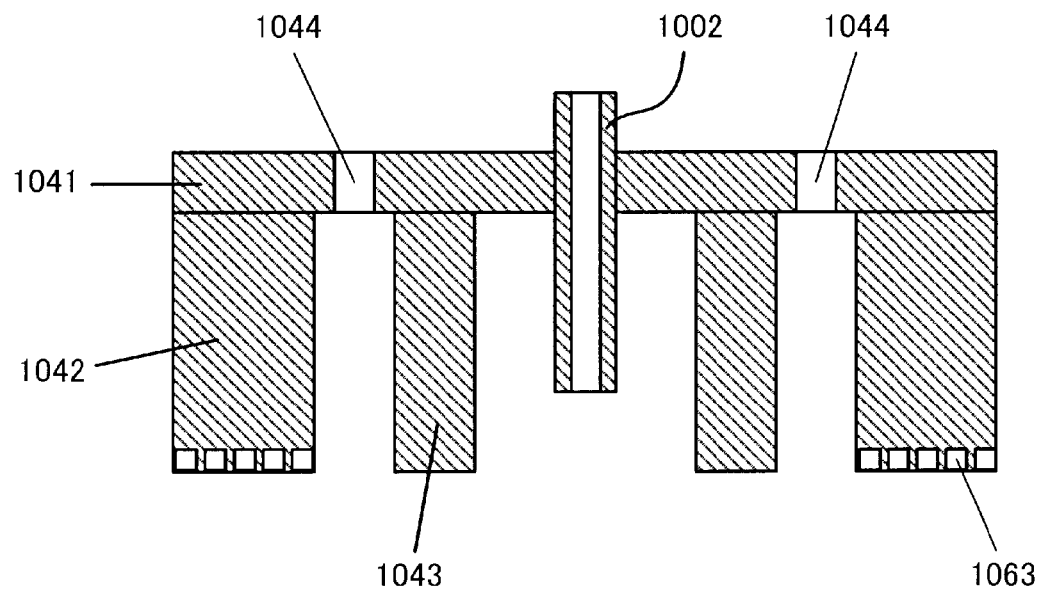
FIGS. 19A and 19B are diagrams showing still yet another labyrinth structure according to Example 4 of the present invention.
Figure 19B:
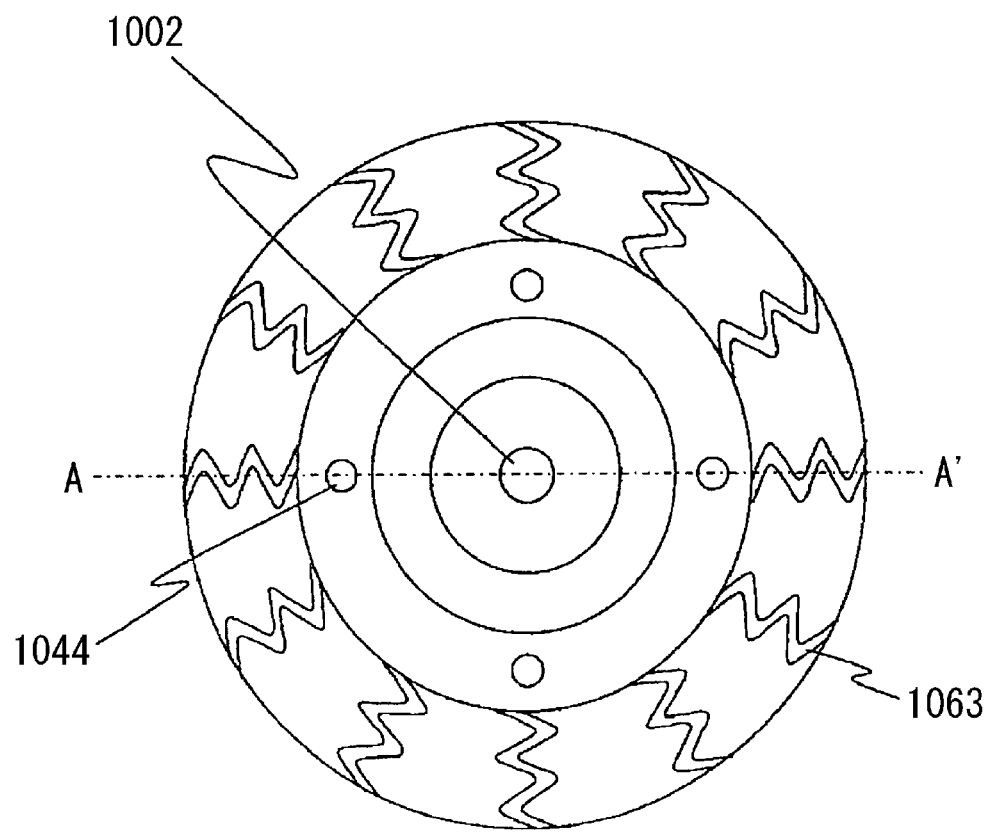

FIGS. 16A to 20B show other labyrinth structures 1045. FIGS. 16B, 17B, 18B, 19B and 20B show the form of local gas sucking and discharging mechanism 1004 as viewed from the bottom, and FIGS. 16A, 17A, 18A, 19A and 20A are cross sectional diagrams showing the local gas sucking and discharging mechanism 1004 as viewed from the side. Though in FIGS. 16A to 20B, a shape for increasing the pressure loss is provided only at the bottom of the outer wall 1042, only the bottom of the inner wall 1043 or both the bottom of the outer wall 1042 and the inner wall 1043 may have the same shape. FIGS. 16A and 16B show the shape of a bottom where a trench in eddy form 1061 is created so that the gas has a speed component in the direction of the circumference, in addition to a speed component in the direction of the radius, when the gas flows from the outside of the outer wall 1042 to the inside in the eddy form, and thus, the length of the flow path of the gas is great, and pressure loss can be increased. In the trench in gear form 1062 shown in FIGS. 17A and 17B, the trench in wave form 1063 shown in FIGS. 19A and 19B, and the trench in rectangular form 1064 shown in FIGS. 20A and 20B also, the gas has a speed component in the direction of the circumference, and the length of the flow path of the gas is great, and thus, pressure loss increases. In addition, in the structure shown in FIGS. 18A and 18B, the shape of the trench in gear form 1062 is the same as in FIGS. 17A and 17B, but with a different pitch, and thus, the gas that passes through the trench in the direction of the radiation in the outer trench in the gear form 1062 can be provided with a speed component in the direction of the circumference, due to the inner trench in the direction of the circumference.

Figure 21:
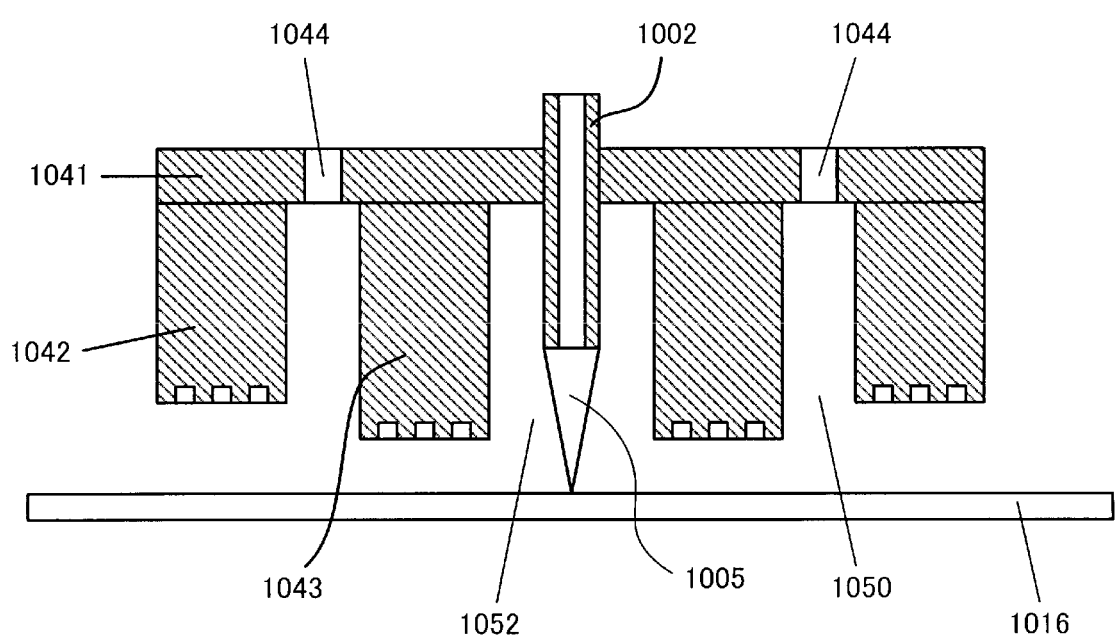
FIG. 21 is a diagram showing another local gas sucking and discharging mechanism according to Example 4 of the present invention.

The degree of vacuum is highest in the vicinity of the gas sucking inlet 1044 in the space between the local gas sucking and discharging mechanism 1004 and the substrate 1016. When the space between the local gas sucking and discharging mechanism 1004 and the substrate 1016 is small, the conductance is also small, and the pressure loss is great, and therefore, the degree of vacuum in the vicinity of the gas sucking inlet 1044 is high. When the degree of vacuum is high, the pressure for sucking the substrate 1016 is great in the local gas sucking and discharging mechanism 1004, and thus, the substrate 1016 is sucked against the local gas sucking and discharging mechanism. In order to prevent suction, the inner wall 1043 may be higher than the outer wall 1042. FIG. 21 is a cross sectional diagram showing the local gas sucking and discharging mechanism 1004 as viewed from the side. The inner wall 1043 is higher than the outer wall 1042 in the structure, and therefore, the space between the substrate 1016 and the inner wall 1043 is smaller than the space between the substrate 1016 and the outer wall 1042. Meanwhile, the structure where the inner wall 1043 is high makes it easy to take air in from the outside, because the space between the outer wall 1042 and the substrate 1016 is great, and thus, the pressure for suction can be kept low and the substrate 1016 prevented from being sucked against the local gas sucking and discharging mechanism 1004. The structure in FIG. 21 can be applied to the fifth and sixth embodiments described below.

Though in the present embodiment, a local film formation apparatus 1020 where microplasma 1005 is generated so that the material gas reacts is described, the invention can be applied to apparatuses for forming a film by locally controlling the flow of a gas (for example laser CVD apparatuses) and substrate surface processing apparatuses.

The present embodiment can reduce the fluctuation in the flow amount of the gas due to the fluctuation in the space, and thus makes highly uniform film formation and uniform surface processing possible, and therefore, defects can be prevented and reduction in cost can be achieved.

(Fifth Embodiment)

Figure 22:
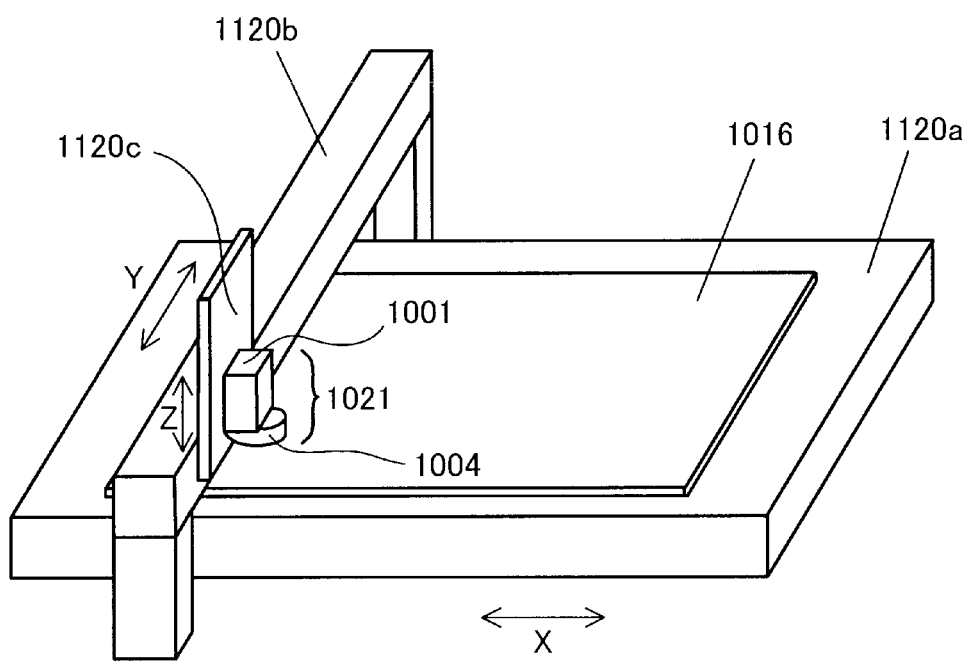
FIG. 22 is a diagram showing a local film forming apparatus according to Example 5 of the present invention.

FIG. 22 shows another embodiment. The local film formation apparatus 1020 has an X stage 1120a, a Y stage 1120b and a Z stage 1120c, which move in the directions X, Y and Z, respectively, and the Z stage 1120c is provided with the head portion 1021 of the local film formation apparatus 1020. The head portion 1021 is formed of a plasma generating chamber 1001 and a local gas sucking and discharging mechanism 1004. The plasma generating chamber 1001 and the local gas sucking and discharging mechanism 1004 according to the present embodiment have the same structure as in the above described fourth embodiment and the below described sixth and seventh embodiments.

Figure 23:
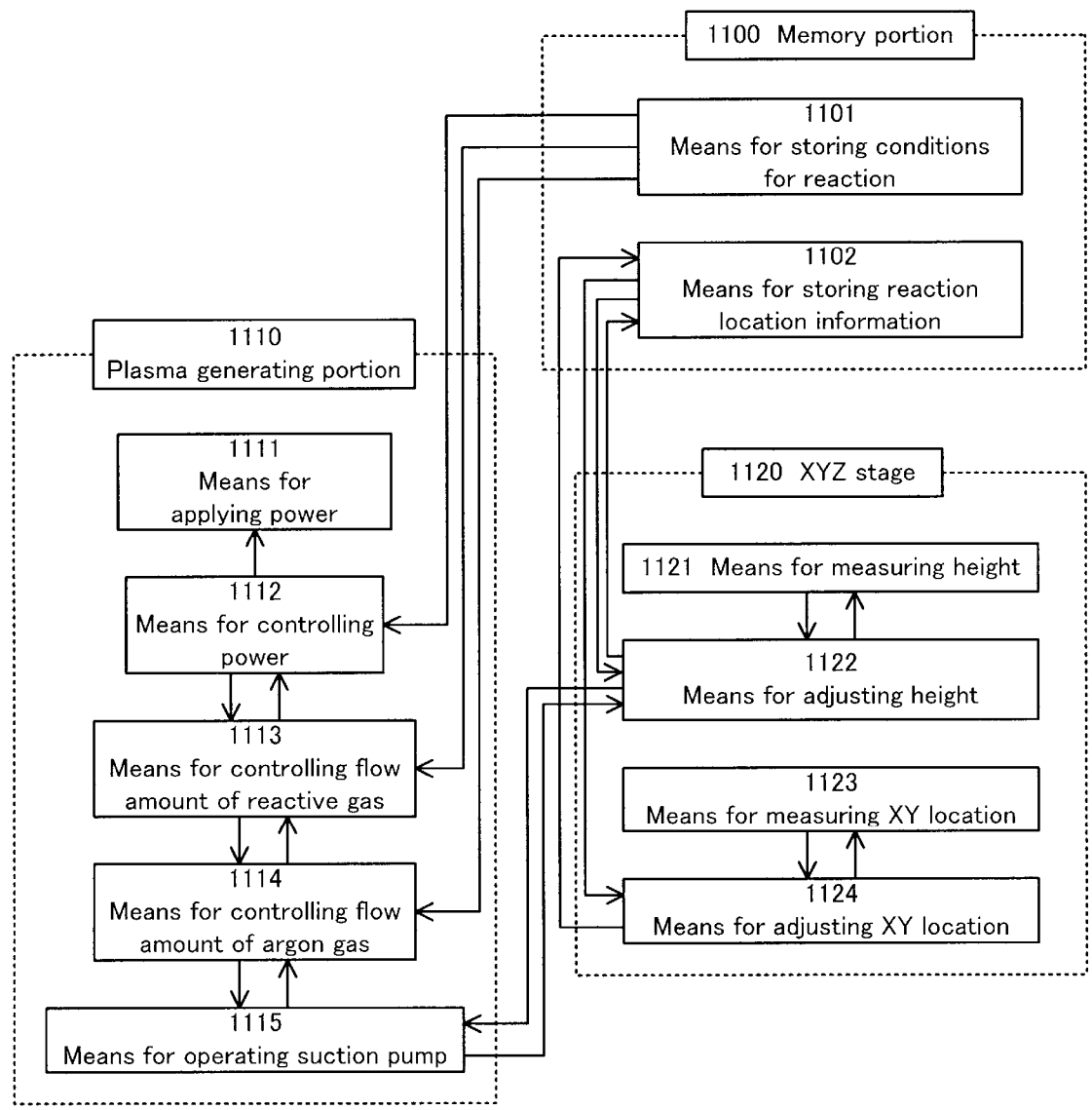
FIG. 23 is a diagram illustrating the configuration of an apparatus according to Example 5 of the present invention.

Next, the components of the local film formation apparatus 1020 are described in reference to FIG. 23. The entire system is formed of a memory portion 1100 made up of a local film formation apparatus 1020, a reaction conditions storing means 1101, a reaction location information storing means 1102, a plasma generating portion 1110 made up of a power applying means 1111, a power control means 1112, a reaction gas flow amount control means 1113, an argon gas flow amount control means 1114, a suction pump operating means 1115, an XYZ stage 1120 made up of a height measuring means 1121, a height adjusting means 1122, and XY location measuring means 1123, and an XY location adjusting means 1124. In addition, as shown in FIG. 24, a pressure conditions storing means 1103 and a pressure measurement results determining means 1104 are added to the memory portion 1100, and a pressure measuring means 1131 is added to the local gas sucking and discharging mechanism 1004, so that the apparatus can adjust the height of the substrate 1016 on the basis of the results of measurement of the pressure in the reaction chamber 1052.

Figure 24:
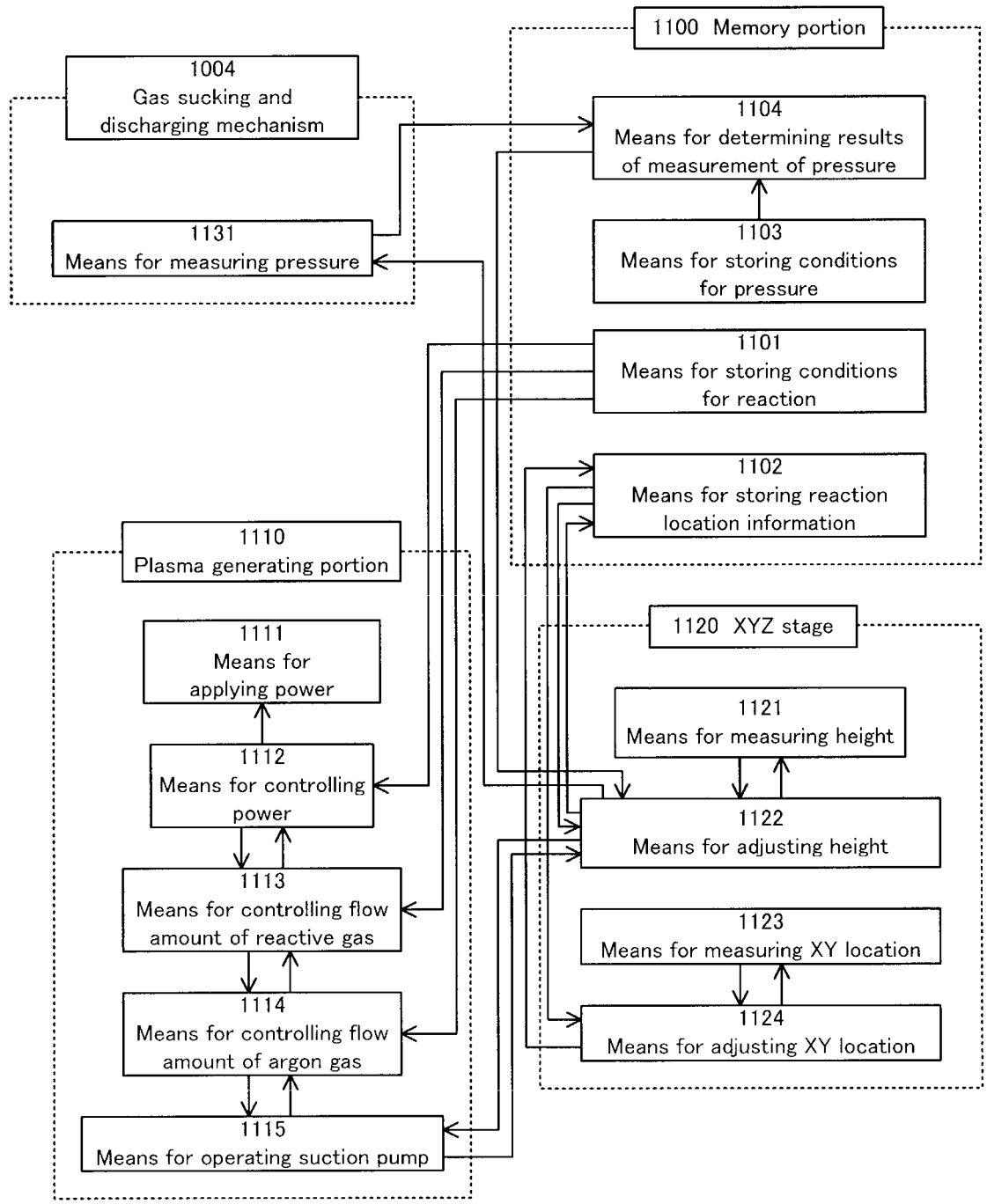
FIG. 24 is a diagram illustrating the configuration of another apparatus according to Example 5 of the present invention.

The method for adjusting the height in the configuration of the apparatus in FIG. 24 is described below in reference to FIG. 25. Though in this embodiment, a local film formation apparatus 1020 for generating microplasma 1005 so that the material gas reacts is described, the invention can be applied to apparatuses for forming a film by locally controlling the flow of a gas (for example laser CVD apparatuses) and substrate surface processing apparatuses.

Figure 25:
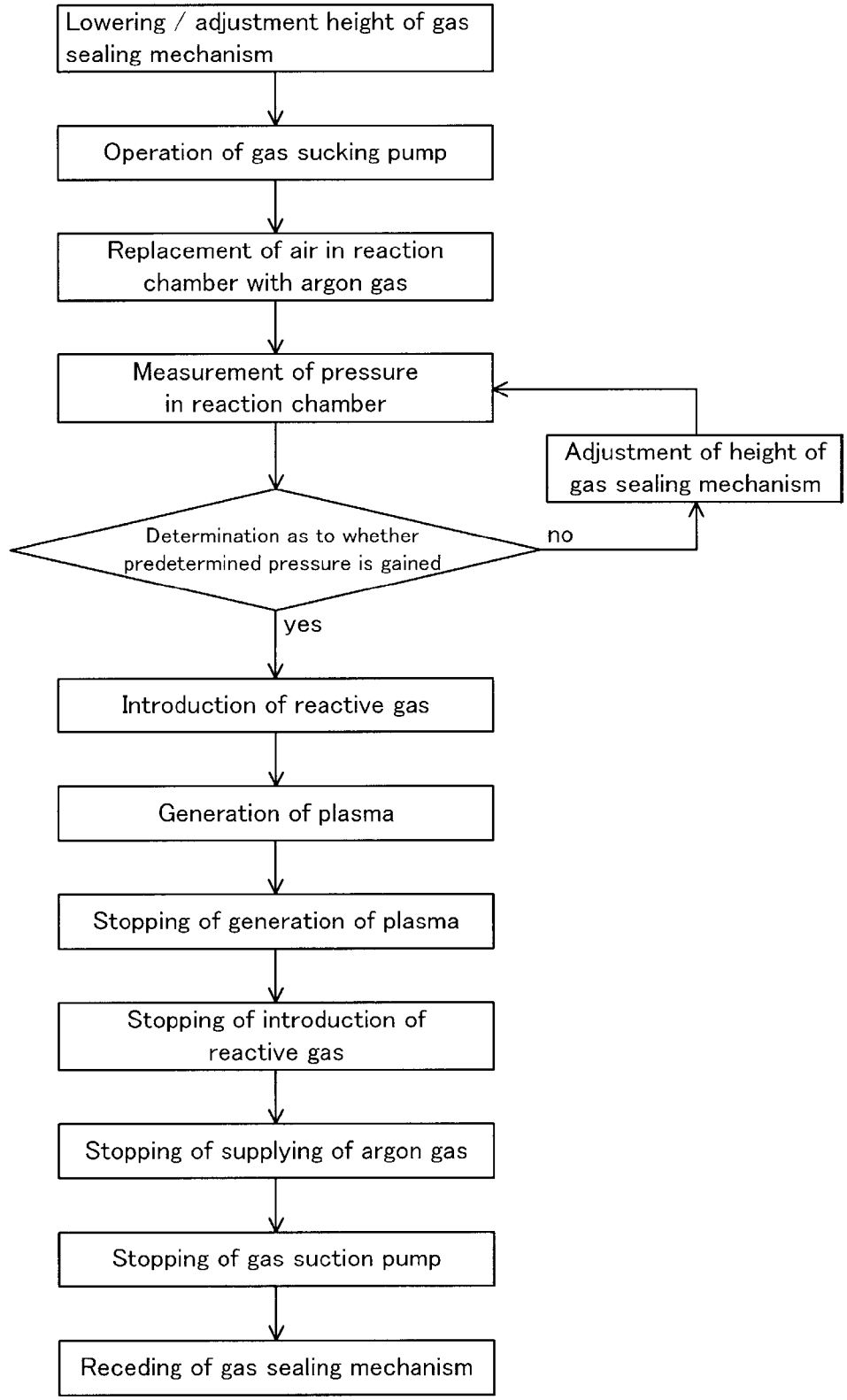
FIG. 25 is a flow chart showing the procedure for adjusting the height according to Example 5 of the present invention.

FIG. 25 is a flow chart showing the process starting when the local gas sucking and discharging mechanism 1004 lowers for film formation and finishing when the local gas sucking and discharging mechanism 1004 recedes. First, the local gas sucking and discharging mechanism 1004 is moved above the film formation region by means of the X stage and the Y stage. In addition, the local gas sucking and discharging mechanism 1004 is brought close to the substrate 1016 by means of the Z stage. Next, the gas sucking pump 1017 is operated, so that suction is started. An inert gas for plasma is introduced into the reaction chamber 1052 without generating microplasma 1005, and the air is expelled, so that the air inside the chamber is replaced with reaction chamber 1052 is replaced with an inert gas atmosphere. The flow amount of the inert gas is controlled by a mass flow controller 1012 so that it becomes the same as that for film formation, and the pressure inside the reaction chamber 1052 is then measured. In the case where the results of measurement are found to be different when compared with a preset optimal pressure, the height of the local gas sucking and discharging mechanism 1004 is finely adjusted by means of the Z stage, so that that the pressure becomes the same. In the case where the pressure in the reaction chamber 1052 is higher than the optimal pressure, the local gas sucking and discharging mechanism 1004 is moved away from the substrate 1016, while in the case where the pressure in the reaction chamber 1052 is lower than the optimal pressure, the local gas sucking and discharging mechanism is brought close to the substrate 1016, so that the conditions become optimal. After adjusting the height, a material gas is introduced into the reaction chamber 1052 and microplasma 1005 is generated. At this time, the microplasma 1005 causes the material gas to react, and a film is formed on the substrate 1016. After the film is formed, the generation of microplasma 1005 is stopped, and the introduction of the material gas is stopped. When the air inside the reaction chamber 1052 is replaced with the plasma gas, the supply of the plasma gas is stopped, and the operation of the suction pump 1017 is stopped. Finally, the local gas sucking and discharging mechanism 1004 recedes.

In the present embodiment, the pressure within the reaction chamber 1052 can be kept constant, irrespectively of the fluctuation of the space. In addition, the height of the substrate 1016 can be adjusted without fail before introducing the material gas, and therefore, the material gas can be prevented from leaking out due to increase in the space between the mechanism and the substrate 1016.

(Sixth Embodiment)

In the following, the sixth embodiment of the present invention is described in reference to FIGS. 26, 27A and 27B. Though in the present embodiment, a local film formation apparatus 1020 where microplasma 1005 is generated so as to react with the material gas is described, the invention can be applied to apparatuses for forming a film by locally controlling the flow of a gas (for example laser CVD apparatuses) and substrate surface processing apparatuses.

Figure 26:
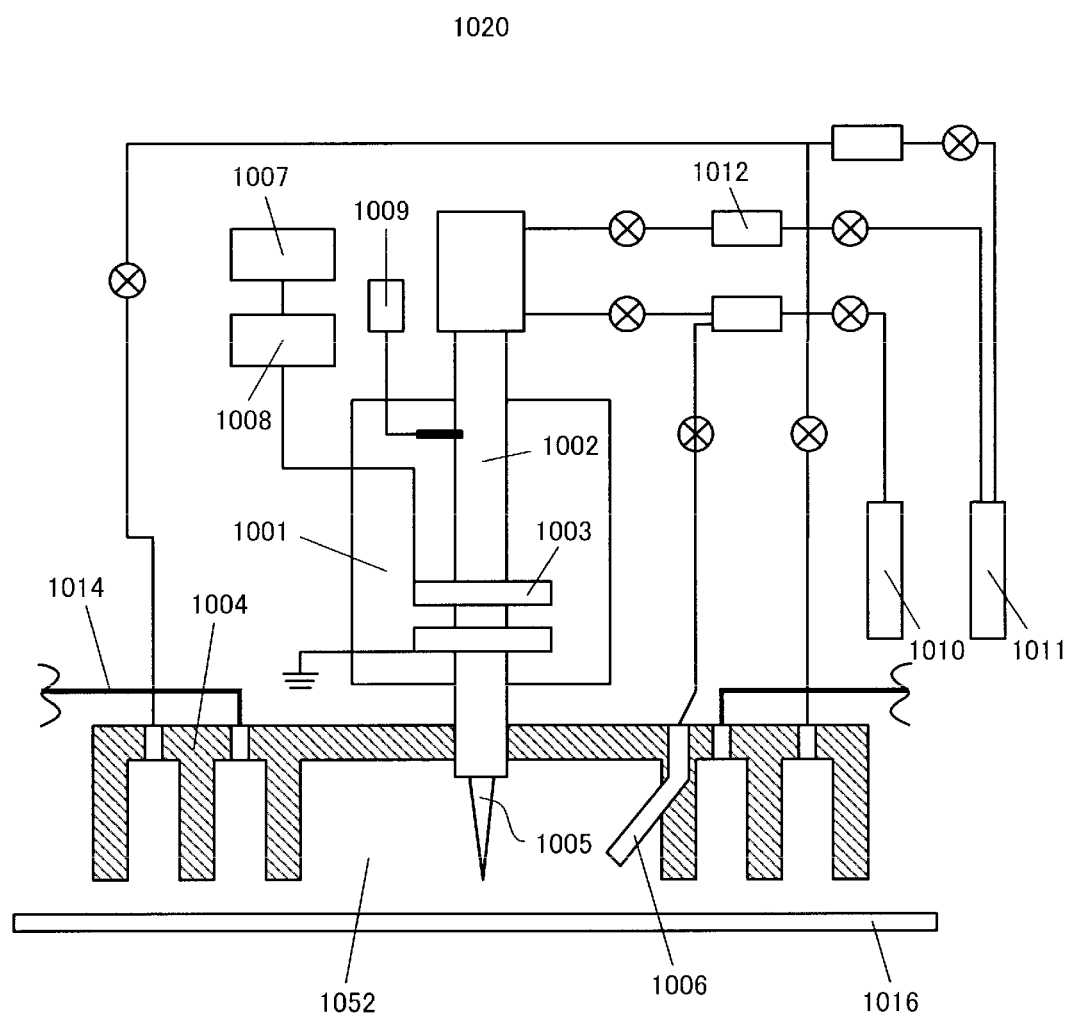
FIG. 26 is a diagram showing a local film forming apparatus according to Example 6 of the present invention.

FIG. 26 shows the configuration of the local film formation apparatus 1020 according to the sixth embodiment. The plasma generating chamber 1001 is provided with a crystal pipe 1002, which is an insulator, a coil 1003 which is wound around the crystal pipe 1002, and an igniter 1009 for igniting plasma, which is connected to the upper portion of the crystal pipe 1002. A high-frequency power supply 1007 and a high-frequency matching box 1008 are connected to one end of the coil 1003, and the other end is grounded. The lower portion of the crystal pipe 1002 passes through the through hole of the local gas sucking and discharging mechanism 1004 and protrudes into the reaction chamber 1052. A material gas and a plasma gas are supplied from a material gas container 1010 and a plasma gas container 1011, respectively, and mass flow controllers 1012 are attached in the middle of the pipes, in order to control the flow amount of the gases. Another pipe for supplying a plasma gas runs from the plasma gas container 1011 in order to supply a plasma gas to the local gas sucking and discharging mechanism 1004. The pipe for the material gas branches in front of the crystal pipe 1002, so that it is possible to blow out the gas from the nozzle 1006 in the vicinity of the microplasma 1005. When a plasma gas is supplied, microplasma 1005 is generated at the end of the crystal pipe 1002, and when the material gas reacts with the microplasma 1005, a film can be formed on the substrate 1016.

Figure 27A:
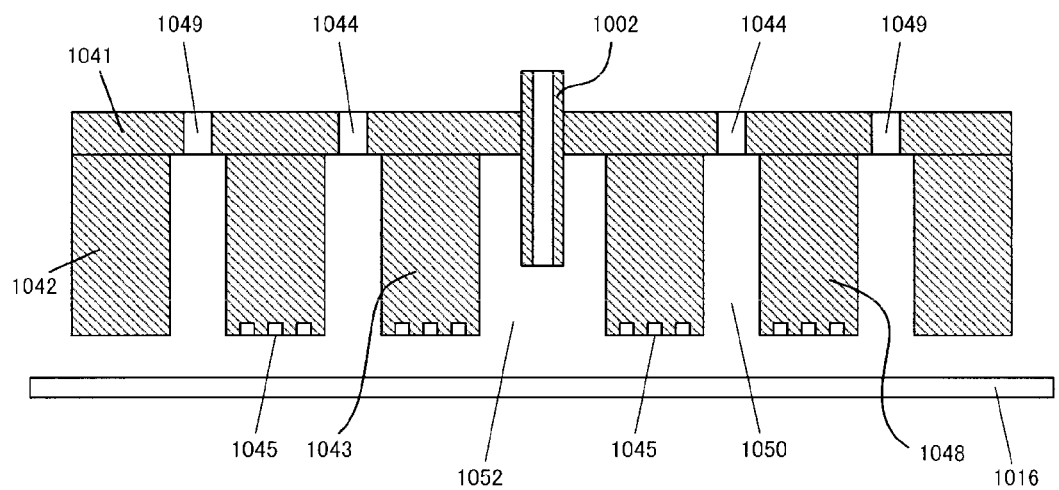
FIGS. 27A and 27B are diagrams illustrating a local gas sucking and discharging mechanism according to Example 6 of the present invention.
Figure 27B:
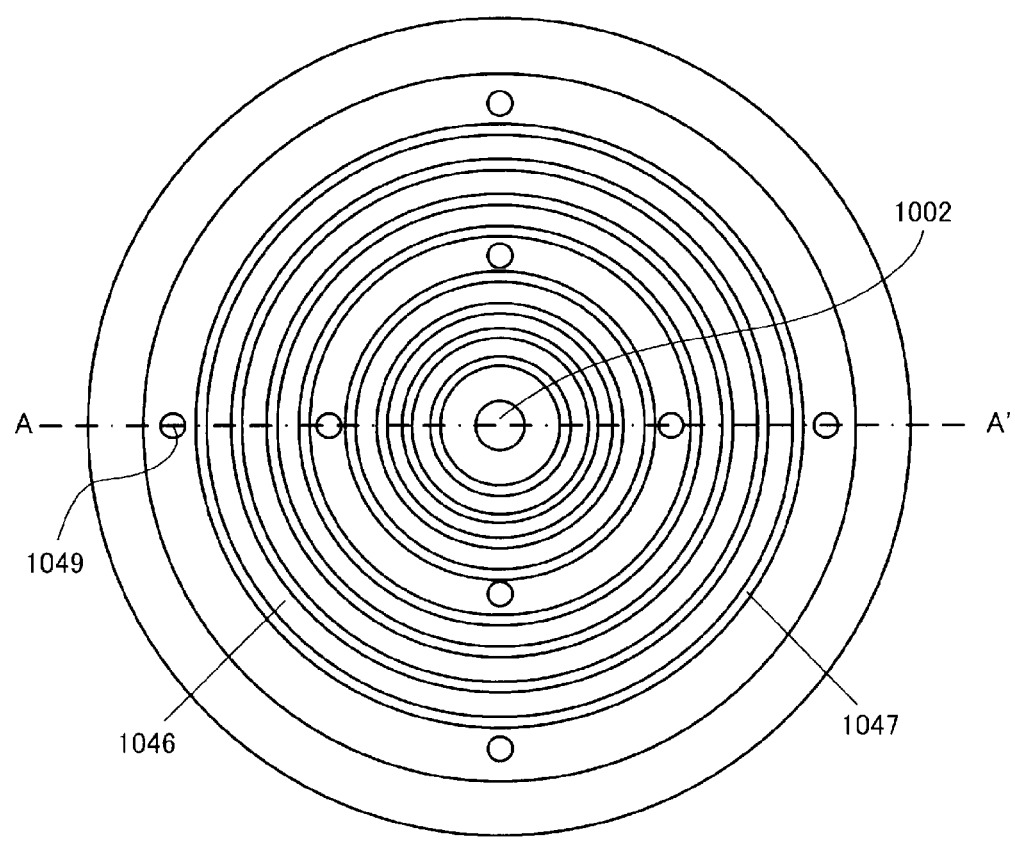
Figure 28A:
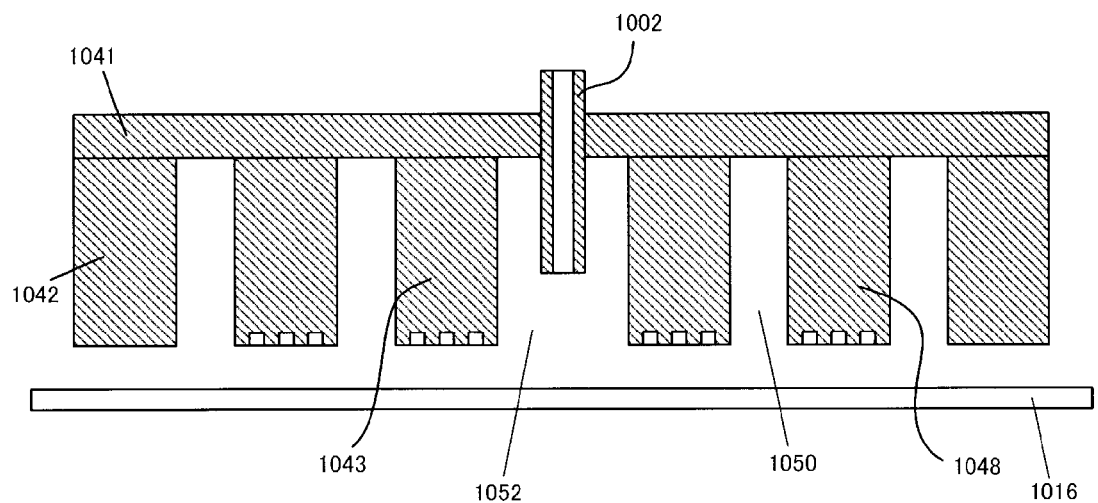
FIGS. 28A and 28B are diagrams illustrating another local gas sucking and discharging mechanism according to Example 6 of the present invention.
Figure 28B:
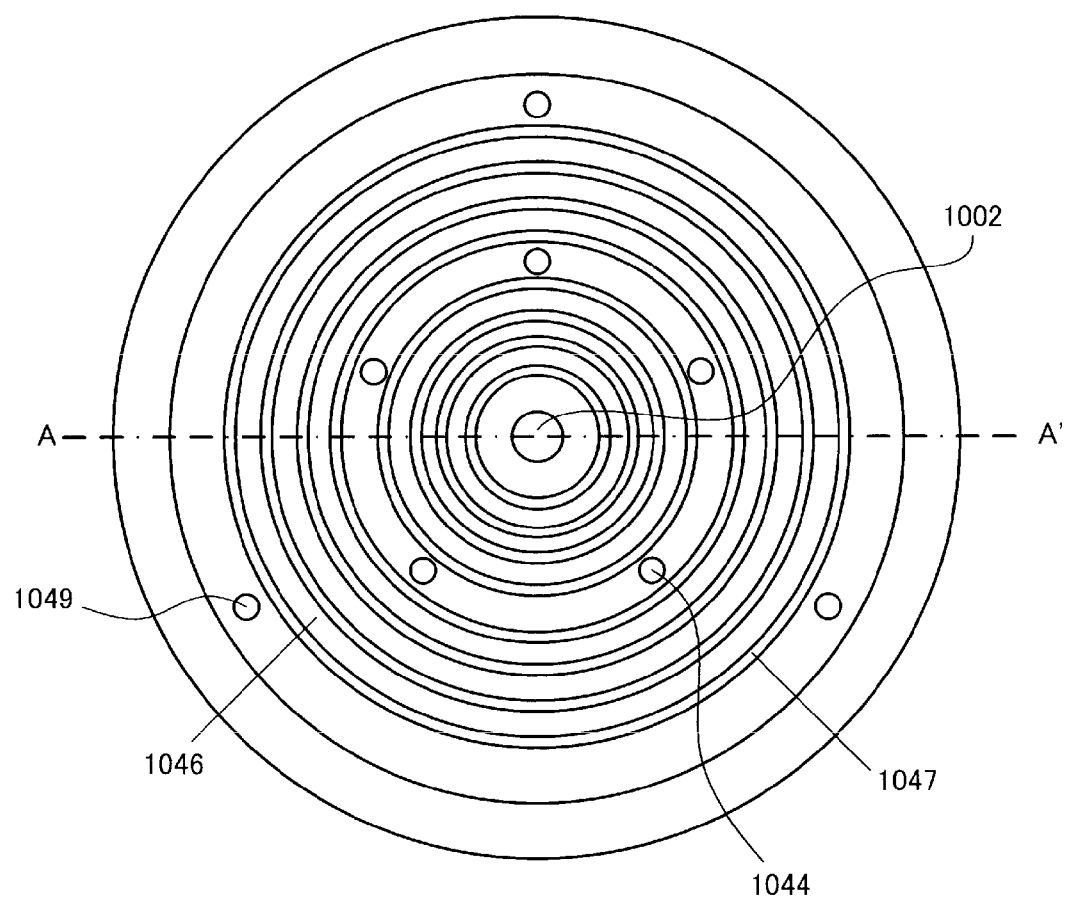

FIGS. 27A and 27B show the structure of the local gas sucking and discharging mechanism 1004 in the embodiment. FIG. 27A is a cross sectional diagram showing the local gas sucking and discharging mechanism 1004 as viewed from the side. The local gas sucking and discharging mechanism 1004 is formed of an upper lid 1041 and three walls of different diameters: an outer wall 1042, a middle wall 1048, and an inner wall 1043, which are aligned in this order from the outside. The upper surface of the outer wall 1042, the middle wall 1048 and the inner wall 1043 is joined to the bottom of the upper lid 1041, and the joint portion is sealed, so that the gas does not leak out. A through hole through which the crystal pipe 1002 passes is created at the center of the upper lid 1041, and the joint portion is sealed, in order to prevent the gas from leaking out between the through hole and the crystal pipe 1002. The crystal pipe 1002 protrudes into the reaction chamber 1052 created in the inner wall 1043, and microplasma 1005 is jetted out from the end portion. A gas sucking inlet 1044 for discharging a gas is created in the upper lid 1041, between the middle wall 1048 and the inner wall 1043. The plasma gas and the material gas in the reaction chamber 1052 pass between the inner wall 1043 and the substrate 1016, and flow into the gas sucking inlet 1044. In addition, a gas outlet 1049 for supplying an inert gas is created in the upper lid 1041, between the outer wall 1042 and the middle wall 1048. The inert gas passes between the middle wall 1048 and the substrate 1016 and is discharged through the gas sucking inlet, or between the outer wall 1042 and the substrate and is discharged around the local gas sucking and discharging mechanism 1004. When a gas outlet 1049 is provided, the effects of preventing air from being taken in and the material gas from leaking out improve. It is desirable to arrange the gas sucking inlet 1044 and the gas outlet 1049 so that the two are symmetrical on either side of the center axis of the crystal pipe. Though FIGS. 27A and 27B show a case where there is an even number of gas sucking inlets 1044 and the number of gas outlets 1049, there may be an odd number of gas sucking inlets 1044 and gas outlets 1049, so that the inlets and outlets respectively form the corners of regular polygons, as shown in FIGS. 28A and 28B.

FIG. 27B is a diagram showing the gas sucking and discharging mechanism 1004 as viewed from the substrate 1016 side. The bottom of the middle wall 1048 and the inner wall 1043 has a labyrinth structure 1045. It is better for the outer wall 1042 not to have a labyrinth structure, so that the inert gas can be smoothly discharged and no air is taken in. In the present embodiment, the fluctuation in the amount of air that is taken in resulting from the fluctuation in the space can be reduced, and the fluctuation in the pressure of the reaction chamber 52 can also be reduced.

In the case where the local gas sucking and discharging mechanism 1004 of the present embodiment is used in the above described local film formation apparatus of the fifth embodiment, the pressure conditions for the gas that is blown out from the gas outlet 1049 may be stored, the pressure measured, and the results of measurement of the pressure determined.

(Seventh Embodiment)

Figure 29A:
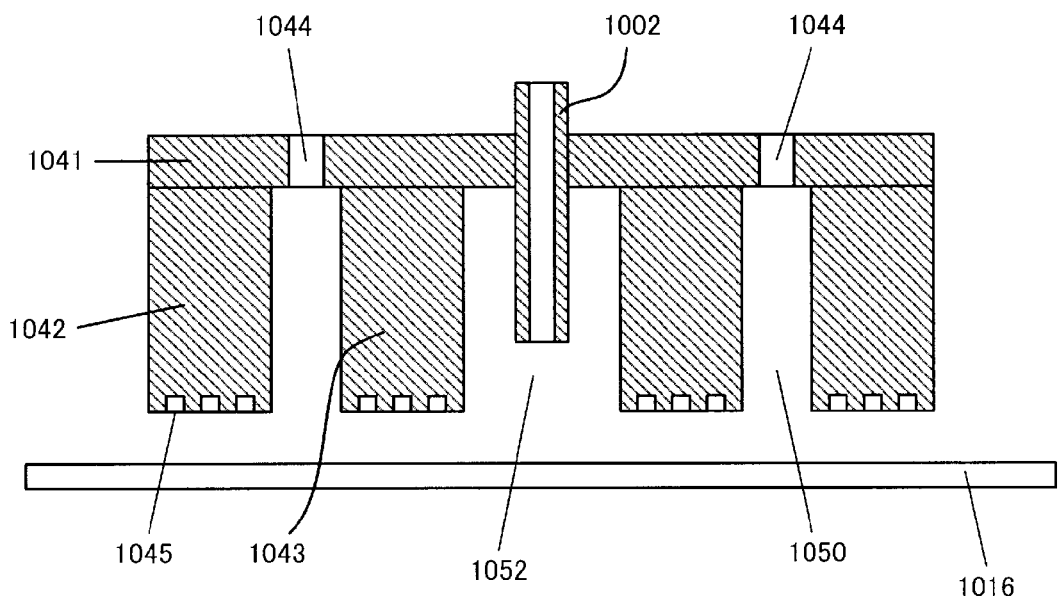
FIGS. 29A and 29B are diagrams illustrating a local gas sucking and discharging mechanism according to Example 7 of the present invention.
Figure 29B:
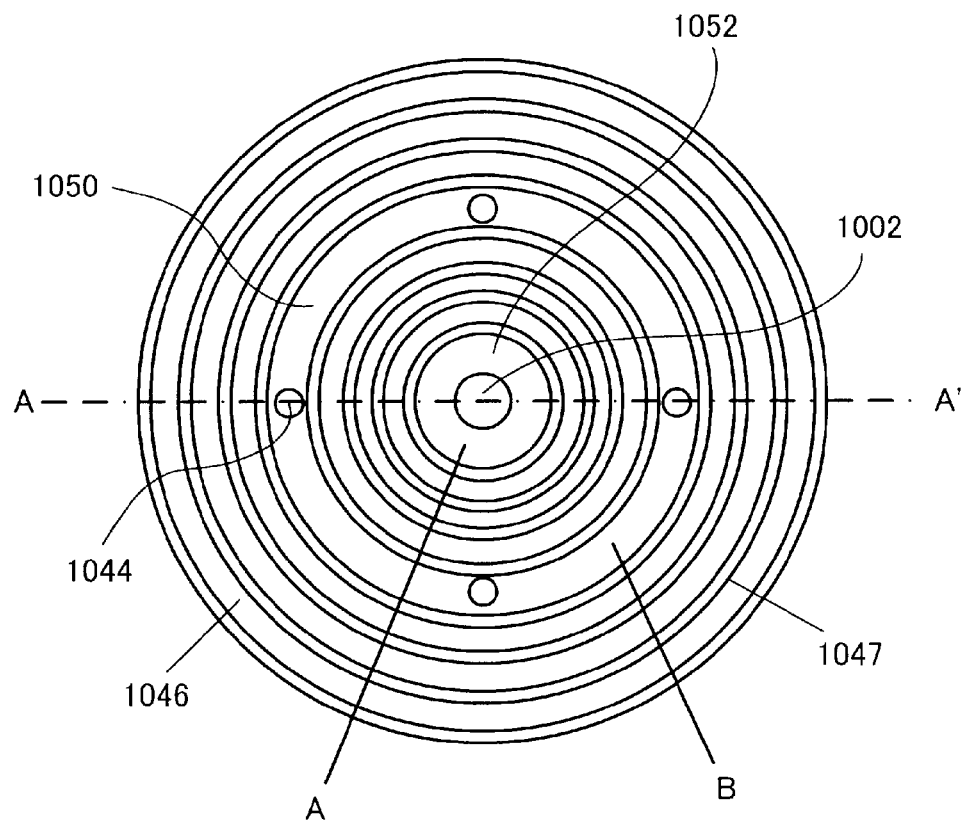

In the following, the seventh embodiment of the present invention is described in reference to FIGS. 29A and 29B. Though in this embodiment, a local film formation apparatus 1020 where microplasma 1005 is generated so as to react with a material gas is described, the invention can be applied to apparatuses for forming a film by locally controlling the flow of a gas (for example laser CVD apparatuses) and substrate surface processing apparatuses.

Figure 20A:
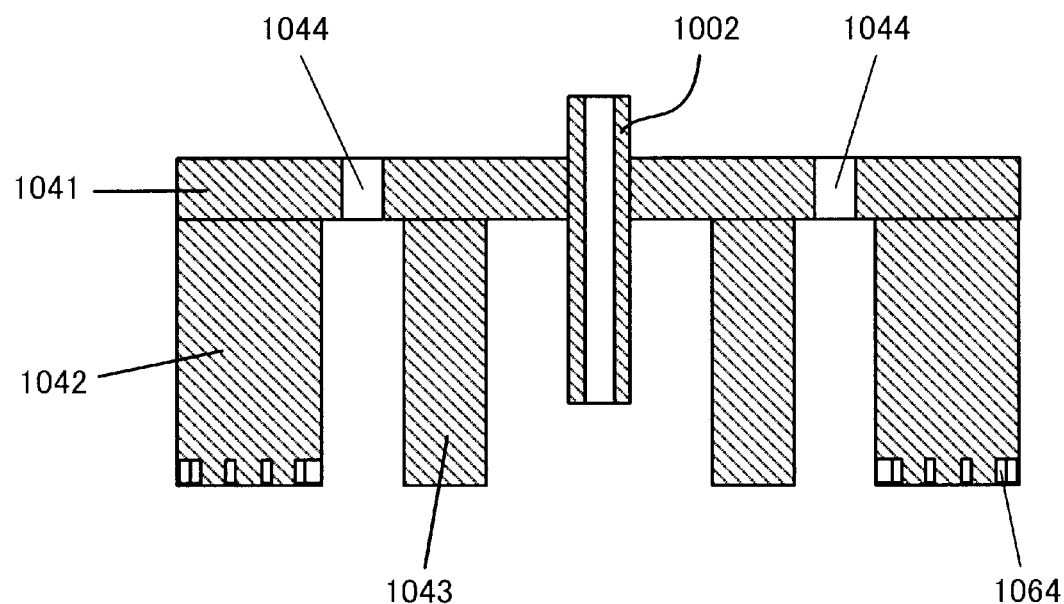
FIGS. 20A and 20B are diagrams showing another labyrinth structure according to Example 4 of the present invention.
Figure 20B:
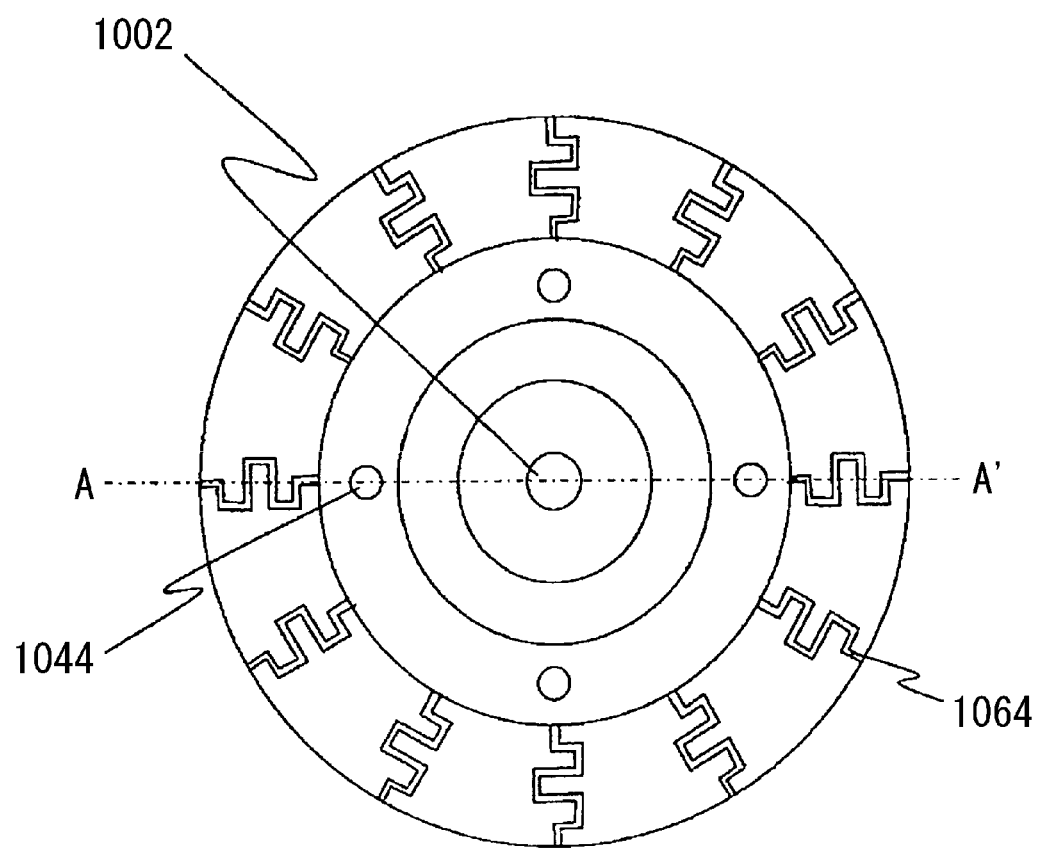

FIGS. 20A and 20B show the structure of the local gas sucking and discharging mechanism 1004 according to this embodiment. FIG. 28A is a cross sectional diagram showing the local gas sucking and discharging mechanism 1004 as viewed from the side, and A is the area of the cross section of the reaction chamber 1052, $P_a$ is the pressure as gauged within the reaction chamber 1052, B is the area of the cross section of the gas discharging chamber 1050, and $P_b$ is the pressure as gauged within the gas discharging chamber 1050.

When $P_aA+P_bB>0$      Formula 1 no upward force is applied to the substrate 1016, and therefore, the substrate 1016 can be prevented from being sucked up.

In addition, in the case where the present embodiment is applied to the local gas sucking and discharging mechanism 1004 in FIG. 27 (Sixth Embodiment), C is the area of the cross section of the space between the middle wall 1048 and the outer wall 1042, and $P_c$ is the pressure as gauged in the space.

When $P_aA+P_bB+P_cC>0$      Formula 2 no upward force is applied to the substrate 1016, and therefore, the substrate 1016 can be prevented from being sucked up.

In the present embodiment, the substrate 1016 can be prevented from being sucked up by the local gas sucking and discharging mechanism 1004.

Industrial Applicability

The repairing apparatus using a plasma jet makes it possible to repair defects which used to be difficult to repair in conventional laser processes, so that defective products, such as liquid crystal display elements, which used to be disposed of as waste, can be repaired, and thus, there is a great advantage, from the point of view of industrial application and environmental conservation.

In addition, the present invention can be applied to plasma generating apparatuses and laser CVD apparatuses where it is necessary to control the flow of the gas in the film forming region.

What is claimed is:

1. An apparatus for repairing a display device having a pattern defect on a surface of a substrate where an electronic circuit pattern having said pattern defect is formed, comprising:
    a first gas supplying portion for supplying a first gas;
    a tubule configured to have a plasma generated within the tubule from the first gas and for jetting the plasma toward the surface of the substrate from the tubule;
    a second gas supplying portion for supplying a second gas comprising a material gas for forming a thin film or an etching gas toward the surface of the substrate from an opening of the second gas supplying portion, wherein the second gas supplying portion is provided separately from and outside of the tubule;
    an observation mechanism including a camera which compares a normal pixel and a defective pixel, recognizes a location and a size of the defect of the pattern defect and categorizes the type of the defect; and
    a mask for making the plasma jet finely pointed, wherein said mask is provided between said tubule and the substrate, the second gas supplying portion is provided between said mask and the substrate, and a plurality of through holes of different dimensions are formed on the mask.

2. The apparatus for repairing a display device according to claim 1, further comprising:
    an open portion, wherein one end of said tubule is inserted into a plasma reaction portion from a side opposite to said open portion;
    an electrode provided around the outer peripheral region of the tubule for generating the plasma from the first gas and supplying high-frequency power from a high-frequency power supply via a matching network: and
    a stage mechanism which can hold said display device and is movable provided in said open portion;
    wherein the observation mechanism receives information on the pattern defect from an inspection apparatus prior to detecting and categorizing the pattern defect.

3. The apparatus for repairing a display device according to claim 2, characterized in that a reactive gas supplied from the second gas supplying portion decomposes in accordance with the physical amount of the gas supplied from said first gas supplying portion.

4. The apparatus for repairing a display device according to claim 3, characterized in that said physical amount of the gas is at least a flow amount, a flow rate, a type of gas, or an ionization degree.

5. The apparatus for repairing a display device according to claim 1, characterized in that said mask is an insulator.

6. The apparatus for repairing a display device according to claim 1, a control portion configured to control a temperature of an article to be processed in accordance with the physical amount of the gas supplied from said first gas supplying portion.

7. The apparatus for repairing a display device according to claim 6, characterized in that said physical amount of the gas is at least a flow amount, a flow rate, a type of gas, or an ionization degree.

* * * * *